United States Patent
Kawai et al.

(10) Patent No.: US 7,544,004 B2
(45) Date of Patent: Jun. 9, 2009

(54) LENS BARREL AND IMAGE PICKUP APPARATUS

(75) Inventors: Hiroshi Kawai, Gifu (JP); Hideharu Miyagaki, Kanagawa (JP)

(73) Assignee: Sony Corporation (JP)

( * ) Notice: Subject to any disclaimer, the term of this patent is extended or adjusted under 35 U.S.C. 154(b) by 364 days.

(21) Appl. No.: 11/355,410

(22) Filed: Feb. 16, 2006

(65) Prior Publication Data

US 2006/0204234 A1  Sep. 14, 2006

(30) Foreign Application Priority Data

Feb. 16, 2005 (JP) ............................ P2005-039019

(51) Int. Cl.
*G03B 17/00* (2006.01)
(52) U.S. Cl. .................... 396/529; 359/823; 396/72
(58) Field of Classification Search ............. 348/240.1, 348/240.2; 359/701, 705, 601, 822–824, 359/826; 396/72, 89, 529
See application file for complete search history.

(56) References Cited

U.S. PATENT DOCUMENTS

| 4,764,784 A | 8/1988 | Torikoshi et al. |
| 4,961,635 A | 10/1990 | Kondo et al. |
| 5,475,457 A * | 12/1995 | Tanaka ........................ 396/83 |
| 5,633,763 A | 5/1997 | Suzuki et al. |
| 5,732,296 A * | 3/1998 | Katano et al. ................ 396/281 |
| 6,929,410 B2 * | 8/2005 | Nguyen et al. ............... 396/463 |
| 2002/0136549 A1 * | 9/2002 | Shintani ....................... 396/89 |

FOREIGN PATENT DOCUMENTS

| JP | 2-275404 A | 11/1990 |
| JP | 10-104493 A | 4/1998 |
| JP | 2003-043328 A | 2/2003 |
| JP | 2003057517 A * | 2/2003 |
| JP | 2004-053854 A | 2/2004 |
| JP | 2004-287279 A | 10/2004 |

* cited by examiner

*Primary Examiner*—Melissa Jan Koval
*Assistant Examiner*—Autumn Parker
(74) *Attorney, Agent, or Firm*—Lerner, David, Littenberg, Krumholz & Mentlik, LLP

(57) ABSTRACT

A lens barrel includes a lens mount for holding a lens in a barrel, a guide shaft extending parallel to an optical axis of the lens within the barrel and connected to the lens mount for guiding the lens mount along the optical axis, and a support operable to support opposite ends of the guide shaft in its extending direction within the barrel, the support including a support unit operable to support at least one of the opposite ends of the guide shaft, the support unit including a hole provided in the barrel, and a bearing member attached from the exterior of the barrel into the hole and being removable therefrom, the bearing member being rotatable about a center axis of the hole, wherein the bearing member includes a shaft inserted into the hole and a bearing hole provided in the shaft, with one end of the guide shaft being inserted into the bearing hole and a center axis of the bearing hole being eccentric from a center axis of the shaft.

6 Claims, 24 Drawing Sheets

FIG. 2
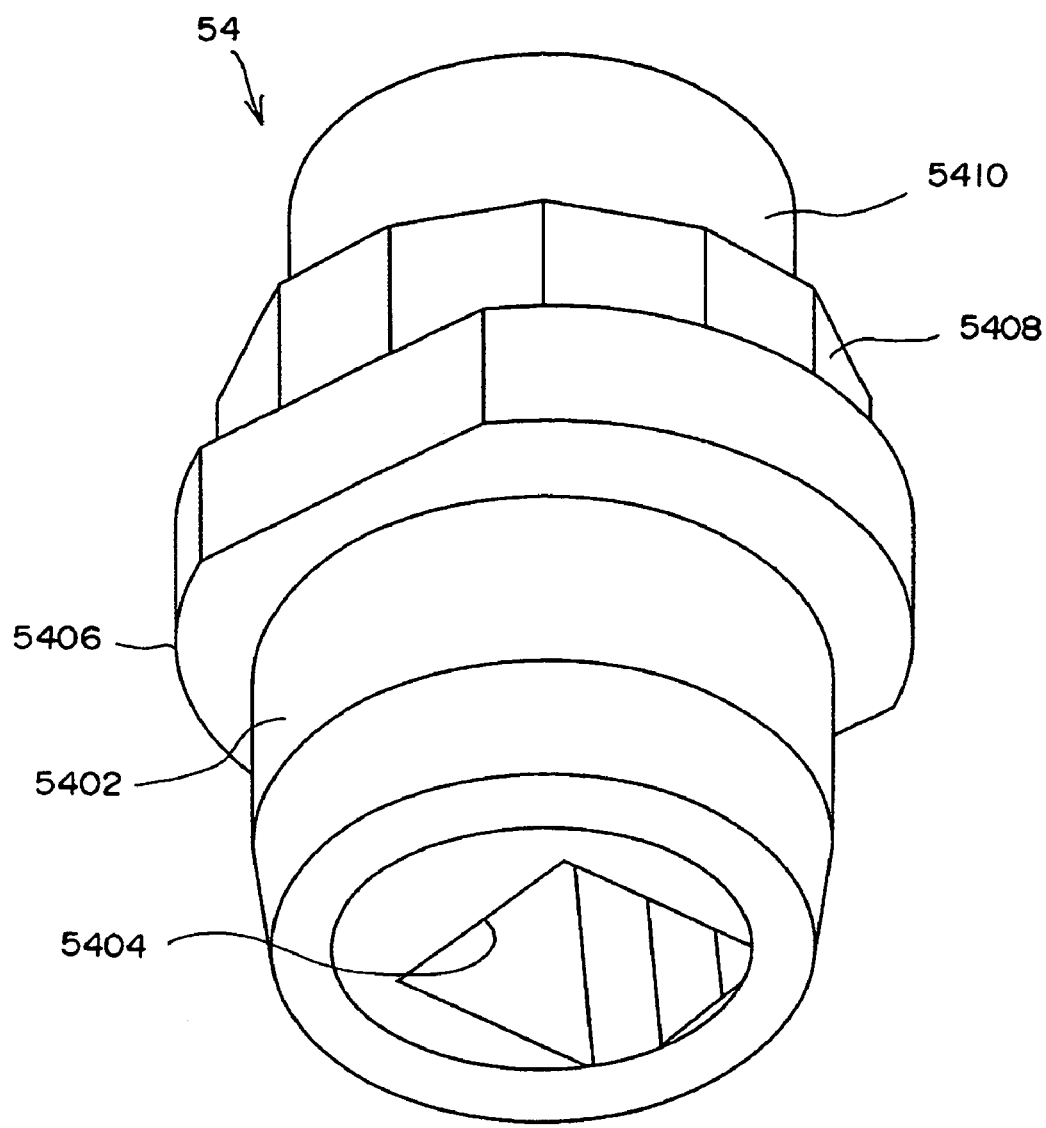
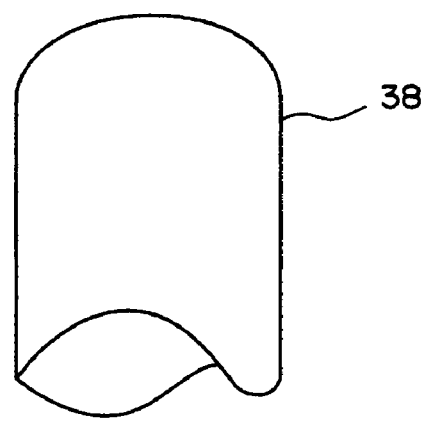

FIG. 20A
FIG. 20B
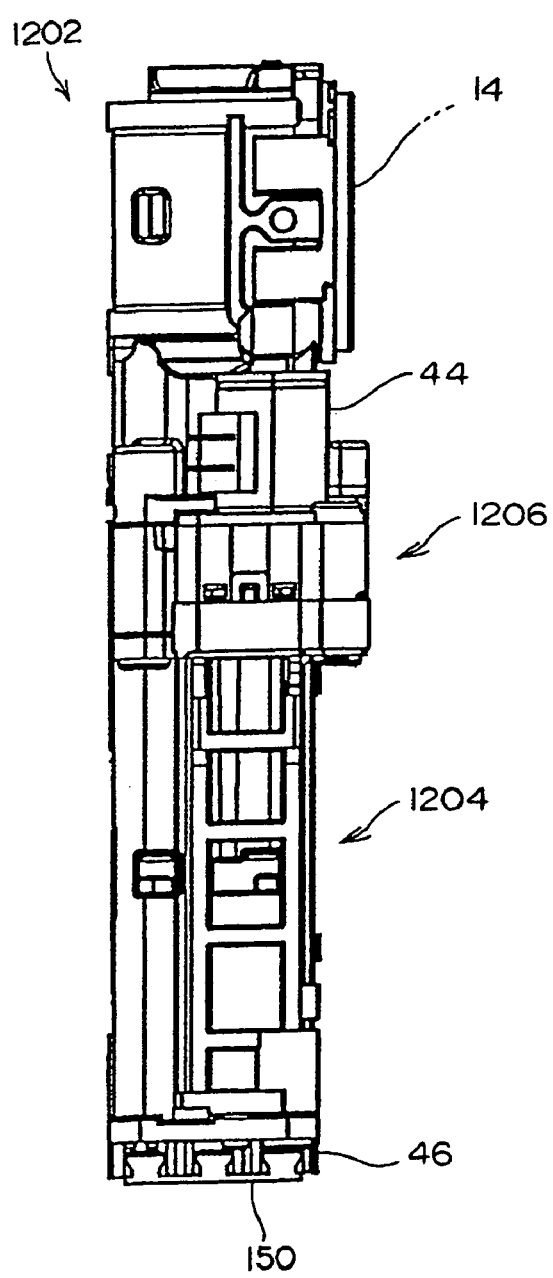
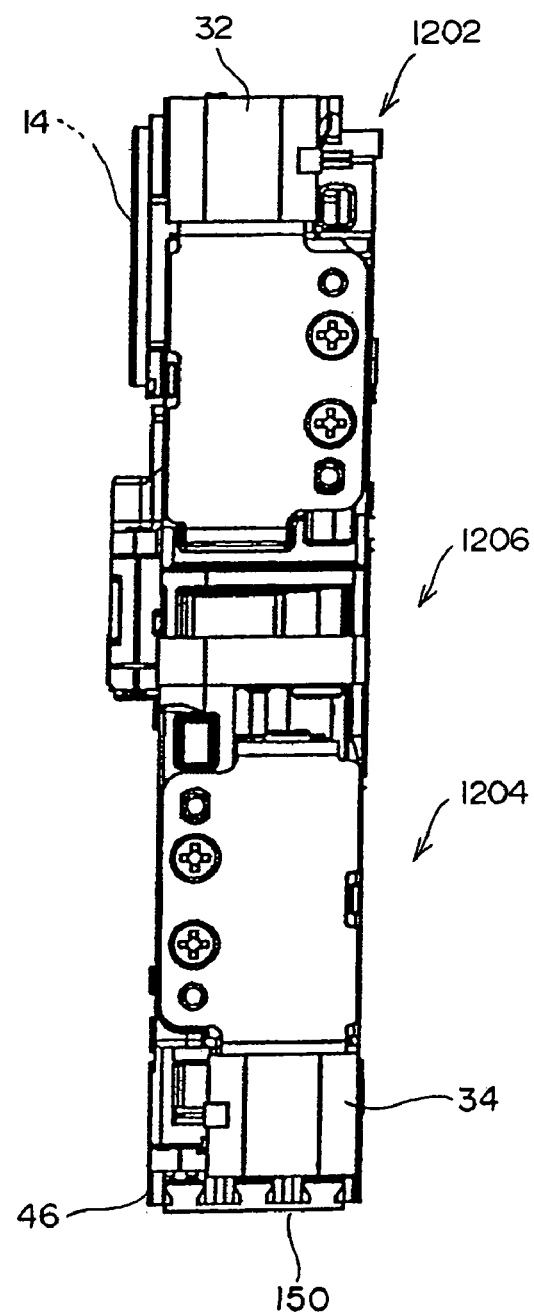

LENS BARREL AND IMAGE PICKUP APPARATUS

CROSS-REFERENCE TO RELATED APPLICATIONS

The present application claims priority from Japanese Patent Application No. 2005-039019, filed on Feb. 16, 2005, the disclosure of which is hereby incorporated by reference herein.

BACKGROUND OF THE INVENTION

The present invention relates to a lens barrel and an image pickup apparatus.

As a lens barrel of an image pickup apparatus such as a digital still camera, there is a lens barrel, in which a zoom lens for a zoom operation is provided so as to be movable in an optical axis direction.

Such a lens barrel includes a lens mount for holding a zoom lens in a barrel, and a guide shaft extending straight in parallel to an optical axis of the zoom lens in the barrel to be connected to the lens mount so as to guide the lens mount along the optical axis. Both ends of the guide shaft in its extending direction are fixed to a part of the barrel within the barrel. An object image is formed through an optical system including the zoom lens on an image-forming surface of an image pickup element provided in the lens barrel.

The optical axis of the zoom lens is sometimes tilted with respect to an optical axis of another optical system provided in the lens barrel due to a variation in size of the lens mount or the barrel or a variation in mount accuracy of the zoom lens to the lens mount.

Such a tilt of the optical axis causes defocusing that partially occurs in the object image formed on the image-forming surface of the image pickup element, so-called partial defocusing.

In order to eliminate such partial defocusing, an adjustment mechanism for adjusting the tilt of the optical axis of the lens has been proposed. For example, an adjustment mechanism for abutting a lens mount against a barrel member by a flat spring while adjusting the tilt between the lens mount and the barrel member with a plurality of adjusting screws has been proposed (see Japanese Patent Application Publication No. 2003-43328).

According to the above-described conventional technique, however, the adjustment mechanism itself is complicated and its adjustment operation is troublesome. Therefore, such a technique is disadvantageous in reduction in size of the lens barrel or reduction in cost.

SUMMARY OF THE INVENTION

The present invention is achieved in view of the above-described conditions and it is desirable to provide a lens barrel and an image pickup apparatus which are capable of reducing the size of the device, reducing the number of components and reducing cost.

According to an embodiment of the present invention, there is provided a lens barrel including a lens mount for holding a lens within a barrel; a guide shaft extending parallel to an optical axis of the lens within the barrel and connected to the lens mount for guiding the lens mount along the optical axis; and a support operable to support opposite ends of the guide shaft in its extending direction within the barrel, the support including a support unit operable to support at least one of the opposite ends of the guide shaft, the support unit including a hole provided in the barrel, and a bearing member attached from the exterior of the barrel into the hole and being removable therefrom, the bearing member being rotatable about a center axis of the hole; the bearing member including a shaft inserted into the hole and a bearing hole provided in the shaft, with one end of the guide shaft being inserted into the bearing hole; and a center axis of the bearing hole being eccentric from a center axis of the shaft.

According to another embodiment of the present invention, there is provided an image pickup apparatus including a lens barrel; an image pickup element provided in the lens barrel; and an optical system for projecting an object image on the image pickup element in the lens barrel, the lens barrel including a lens mount for holding a lens of the optical system within the barrel; a guide shaft extending parallel to an optical axis of the lens within the barrel and connected to the lens mount for guiding the lens mount along the optical axis; and a support operable to support opposite ends of the guide shaft in its extending direction within the barrel, the support including a support unit operable to support at least one of the opposite ends of the guide shaft, the support unit including a hole provided in the barrel, and a bearing member attached from the exterior of the barrel into the hole and being removable therefrom, the bearing member being rotatable about a center axis of the hole; the bearing member including a shaft inserted into the hole and a bearing hole provided in the shaft, with one end of the guide shaft being inserted into the bearing hole; and a center axis of the bearing hole being eccentric from a center axis of the shaft.

According to an embodiment of the present invention, the bearing member that supports one end of the guide shaft includes the shaft inserted from the exterior of the barrel into the hole so as to be removable therefrom and the bearing hole having the center axis eccentric from the center axis of the shaft.

Therefore, for example, by preparing a plurality of types of bearing members, each having a different amount of eccentricity between the center axis of the bearing hole and the center axis of the shaft, easy adjustment of the optical axis of the lens can be ensured.

Moreover, a complicated mechanism such as a conventional one can be simplified, and a large space is not needed. Accordingly, such a structure is advantageous in reducing the number of components, reducing cost, and reducing the size of the lens barrel.

By providing the shaft inserted from the exterior of the barrel into the hole so as to be removable therefrom and the bearing hole having the center axis eccentric from the center axis of the shaft for the bearing member for supporting one end of the guide shaft, the above-mentioned advantages are realized.

BRIEF DESCRIPTION OF THE DRAWINGS

FIG. 2 is a perspective view showing the bearing member viewed from below;

FIG. 20A is a view on arrow A in FIG. 18, and FIG. 20B is a view on arrow B in FIG. 18;

DETAILED DESCRIPTION

Next, an embodiment of the present invention will be described with reference to the accompanying drawings.

In this embodiment, the case where a lens barrel according to the present invention is incorporated into an image pickup apparatus will be described.

Figure 11:
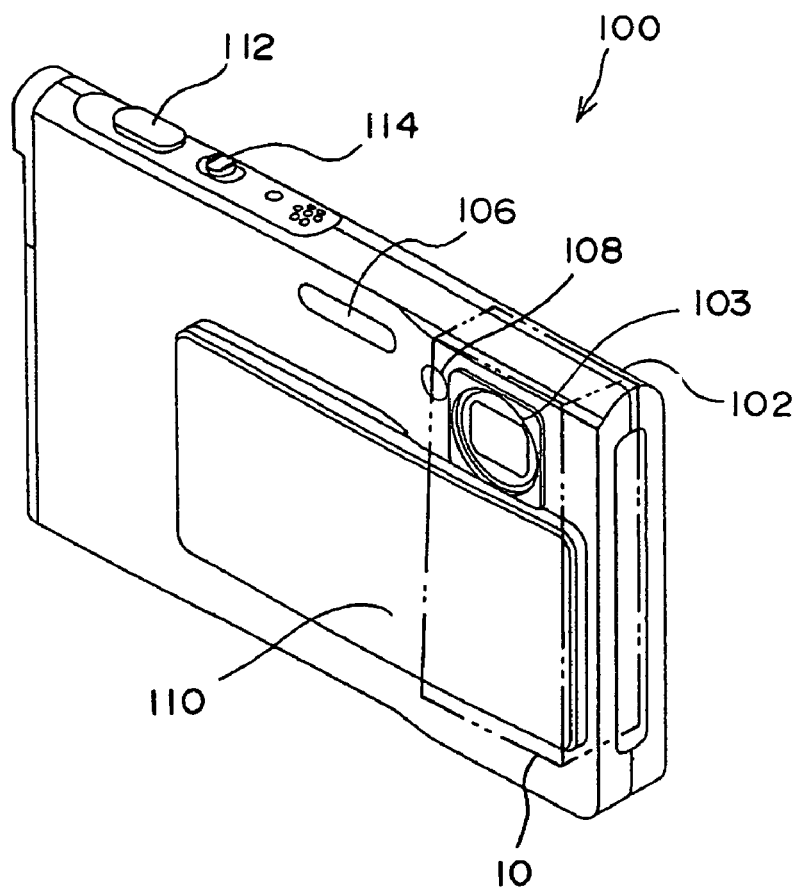
FIG. 11 is a perspective view of an image pickup apparatus viewed from the front side.
Figure 12:
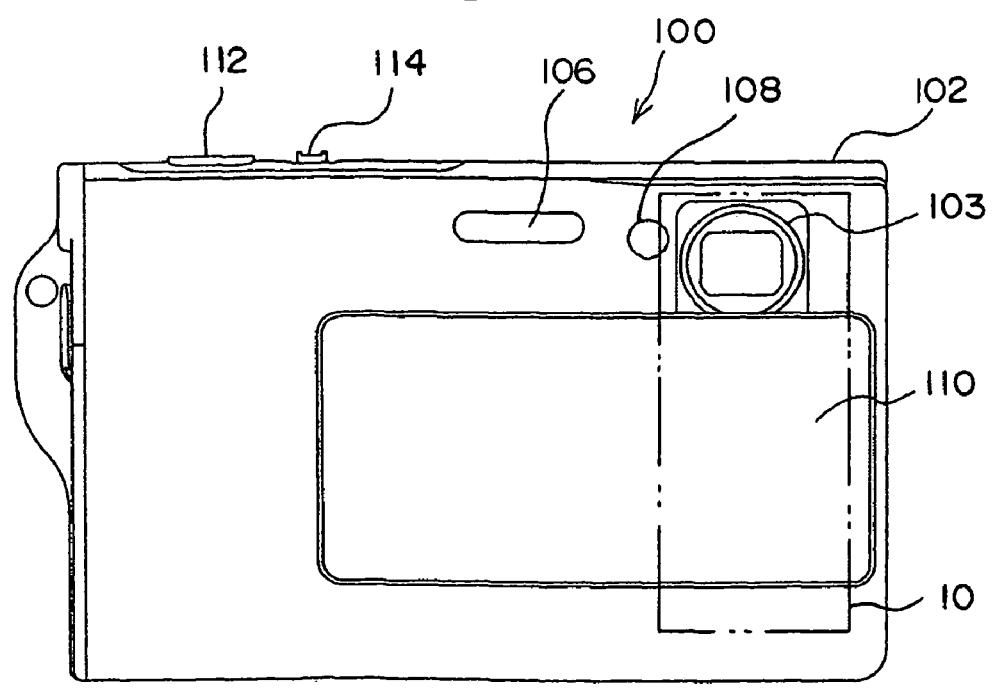
FIG. 12 is a front view of the image pickup apparatus.
Figure 13:
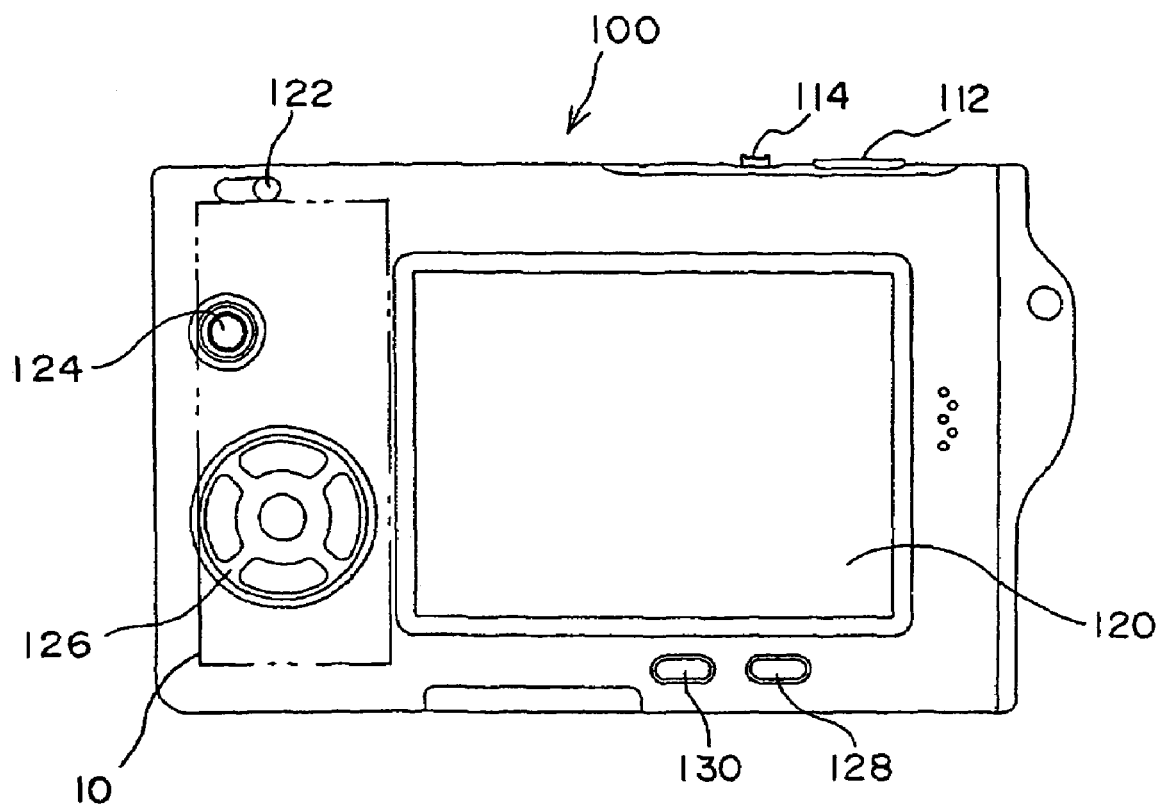
FIG. 13 is a back view of the image pickup apparatus.
Figure 14:
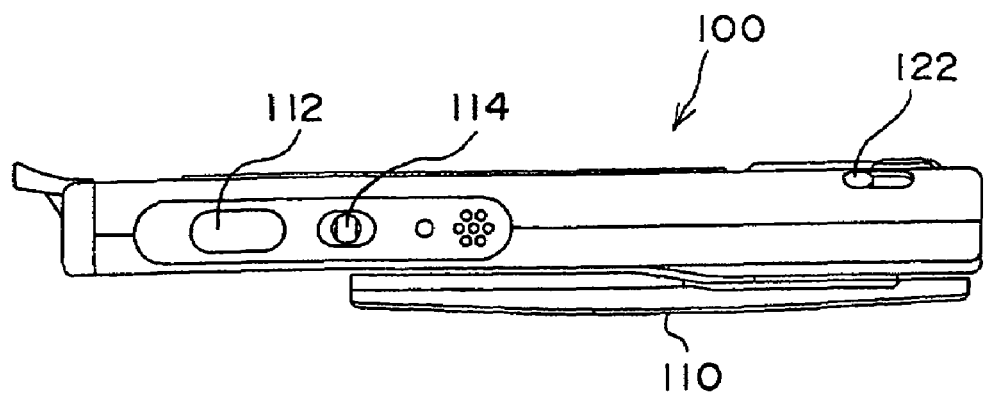
FIG. 14 is a plan view of the image pickup apparatus.
Figure 15:
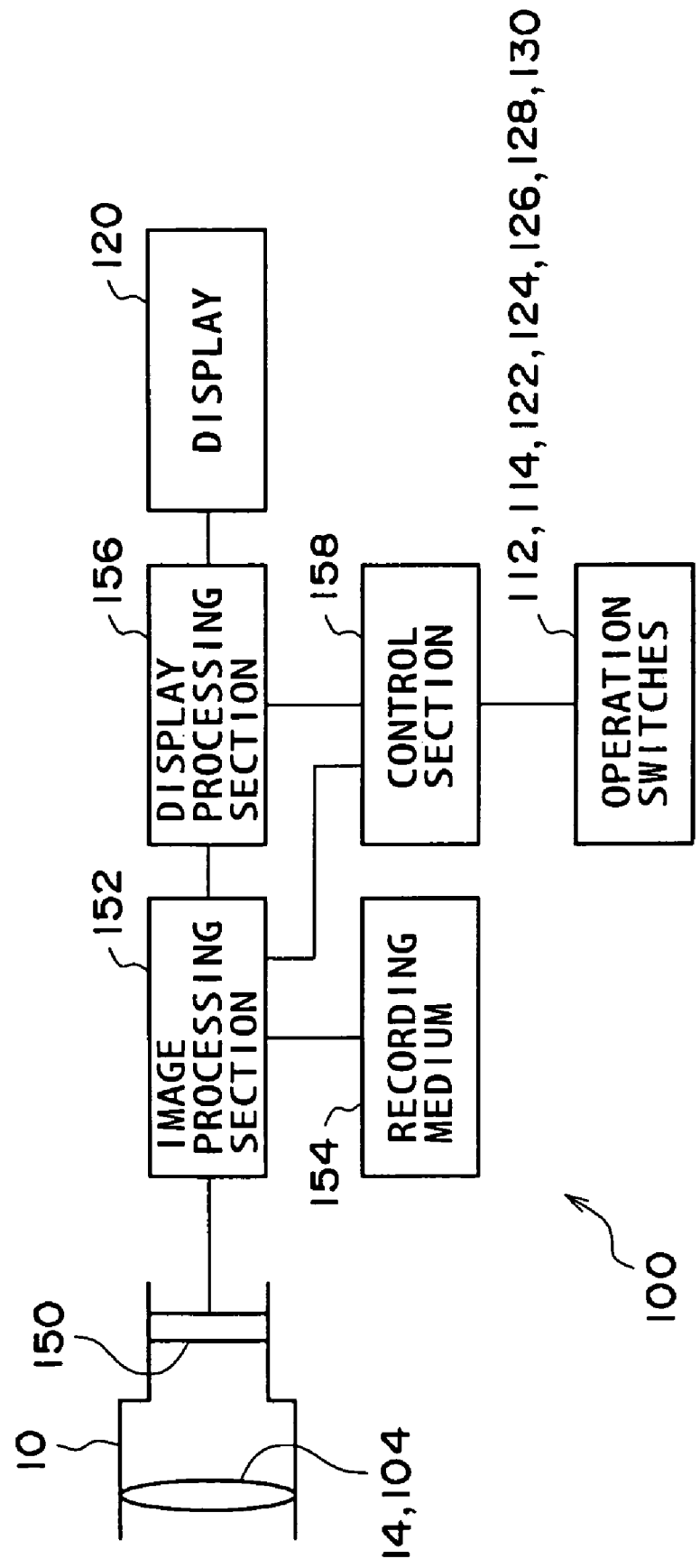
FIG. 15 is a block diagram showing a control system of the image pickup apparatus.

FIG. 11 is a perspective view showing an image pickup apparatus viewed from the front side, FIG. 12 is a front view of the image pickup apparatus, FIG. 13 is a back view of the image pickup apparatus, FIG. 14 is a plan view of the image pickup apparatus, and FIG. 15 is a block diagram showing a control system of the image pickup apparatus.

Throughout this specification, a horizontal direction (the right and the left) corresponds to that when the image pickup apparatus is viewed from the front side. The object side is referred to as the front side, whereas the image pickup apparatus side is referred to as the back side.

As shown in FIGS. 11 through 14, an image pickup apparatus 100 is a digital still camera and includes a case 102 constituting an outer casing. Into the right part of the case 102, a lens barrel 10 according to the present invention is incorporated as indicated with a chain double-dashed line.

The lens barrel 10 includes, as shown in FIG. 15, a barrel 12, an image pickup element 150 housed within the barrel 12, an optical system 104 for projecting an object image housed within the barrel 12 on the image pickup element 150, and the like.

The optical system 104 includes an objective lens 14. The objective lens 14 is provided so as to be oriented forward through a lens window 103 (shown in FIGS. 11 and 12) provided on the front face of the case 102.

Referring back to FIGS. 11 and 12, in the center of the upper part of the front face of the case 102, a flash 106 for emitting photographing light, a self-timer lamp 108 and the like are provided.

On the front face of the case 102, a barrier 110 is provided so as to be vertically slidable. The barrier 110 slides to a lower limit position at which the lens window 103, the flash 106 and the self-timer lamp 108 are exposed forward and to an upper limit position at which the lens window 103, the flash 106 and the self-timer lamp 108 are covered.

On an upper end face of the case 102, a shutter button 112 for photographing images and a zoom operation switch 114 for adjusting the zoom of the photographing optical system are provided. On the upper part of a left side face of the case 102, a power switch (not shown) for turning power ON/OFF is provided.

On the rear face of the case 102, shown in FIGS. 13, a display 120 for displaying a photographed image is provided. On the side of the display 120, a mode change switch 122 for switching a mode between a still image shooting mode, a motion image shooting mode and a reproducing mode, a menu switch 124 for displaying a menu on the display 120 and a control switch 126 for an operation such as selection on the menu displayed on the display 120 are provided.

Below the display 120 on the rear face of the case 102, a display switch 128 for turning the display 120 ON/OFF, an image size change switch 130 and the like are provided.

As shown in FIG. 15, the image pickup element 150 consists of a CCD or a CMOS sensor for taking an object image formed through the optical system 104. The image taken by the image pickup element 150 is output to an image processing unit 152 as an imaging signal. The image processing unit 152 processes the imaging signal to generate image data of a still image or a motion image, which is then recorded on a memory card (recording medium) 154. The image data is displayed on the display 120 by a display processing unit 156.

Furthermore, the image pickup apparatus 100 includes a control unit 158 including a CPU for controlling the image processing unit 152, the display processing unit 156 and the like in accordance with an operation of the operation switches such as the shutter button 112, the zoom operation switch 114, the power switch, the mode change switch 122, the menu switch 124, the control switch 126, the display switch 128, the image size change switch 130 and the like.

Figure 16:
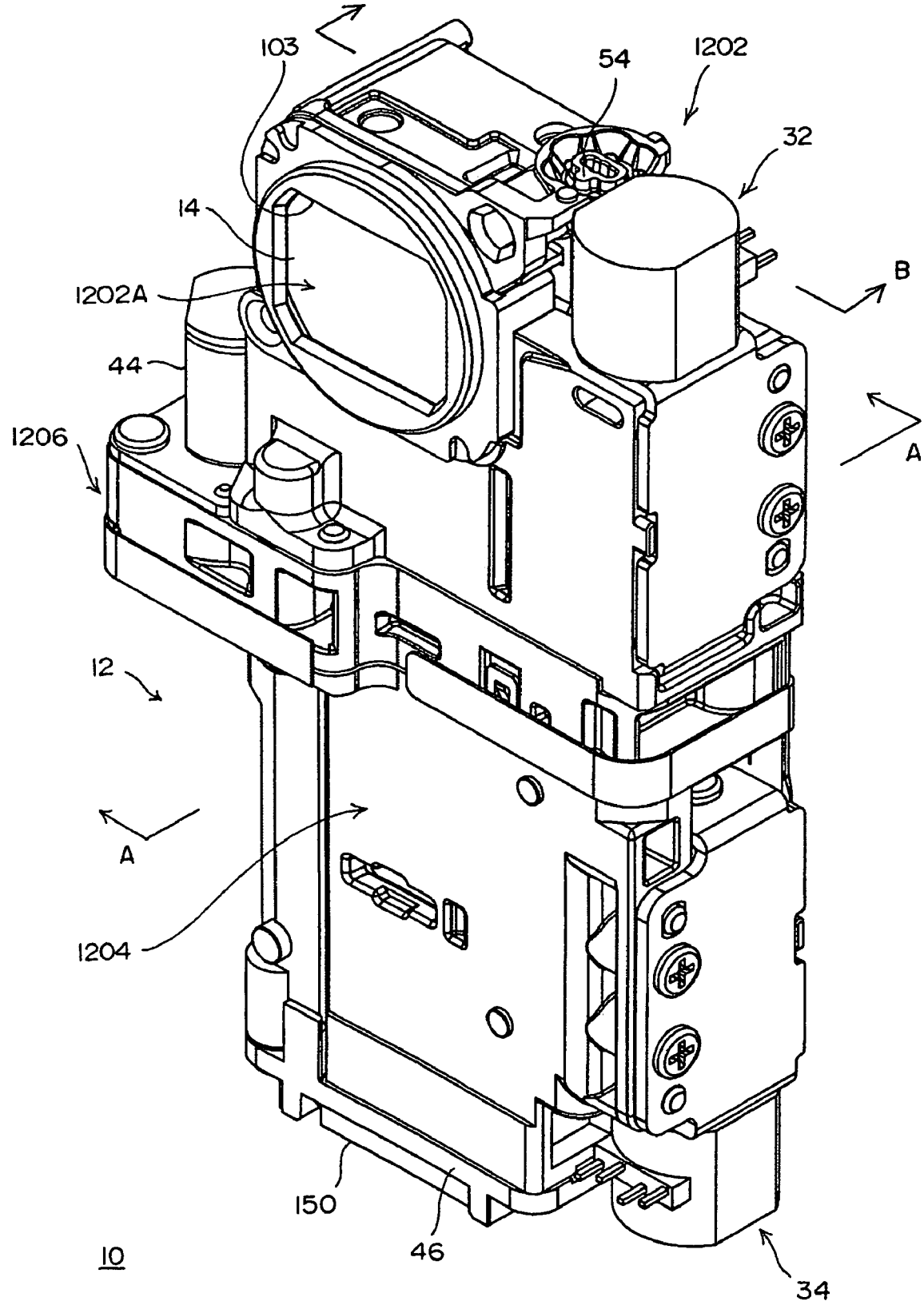
FIG. 16 is a perspective view showing a lens barrel viewed from the front side.
Figure 17:
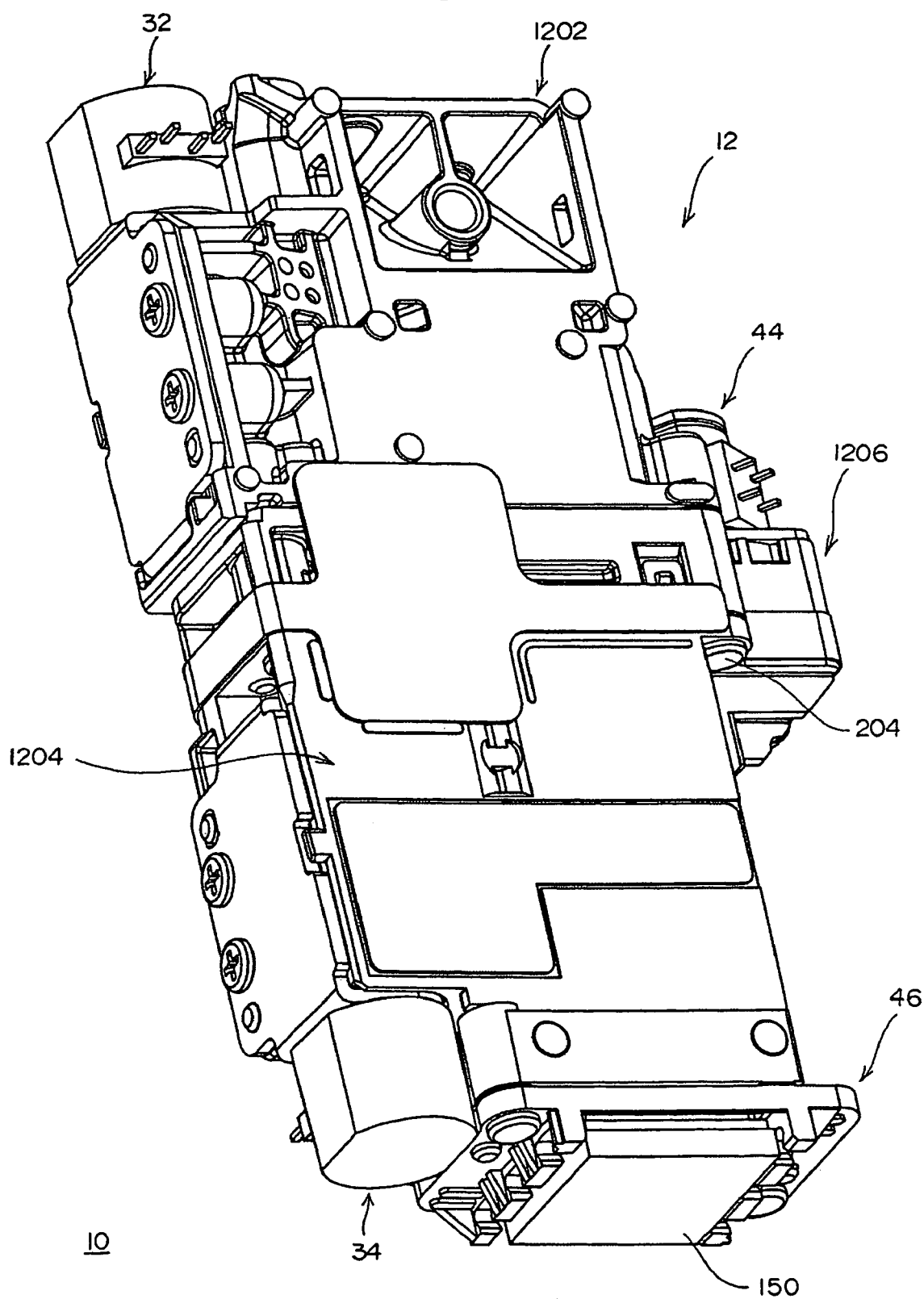
FIG. 17 is a perspective view showing the lens barrel viewed from the rear bottom side.

FIG. 16 is a perspective view showing the lens barrel 10 viewed from the front side, and FIG. 17 is a perspective view showing the lens barrel 10 viewed from the lower bottom side.

Figure 18:
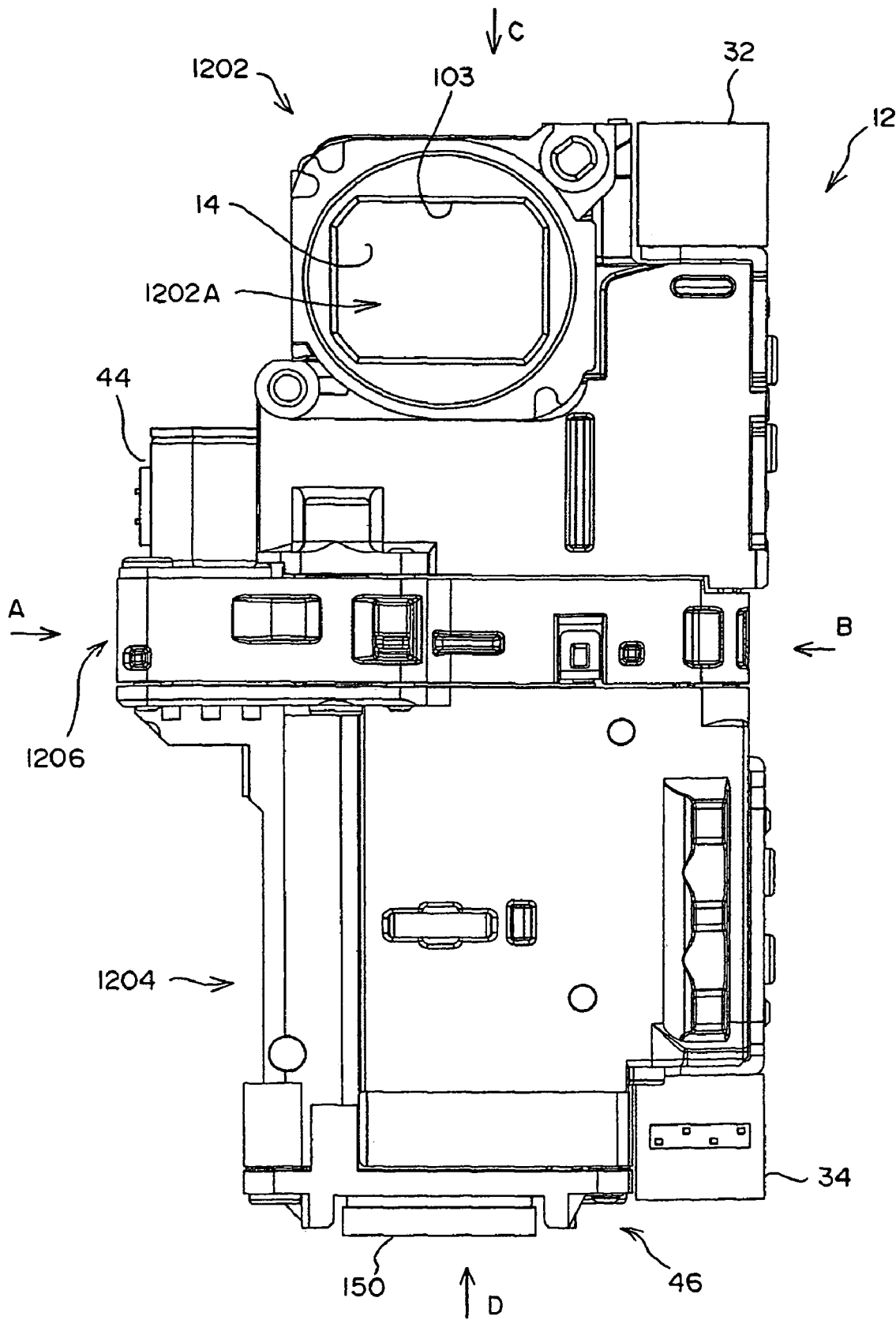
FIG. 18 is a front view of the lens barrel.
Figure 19:
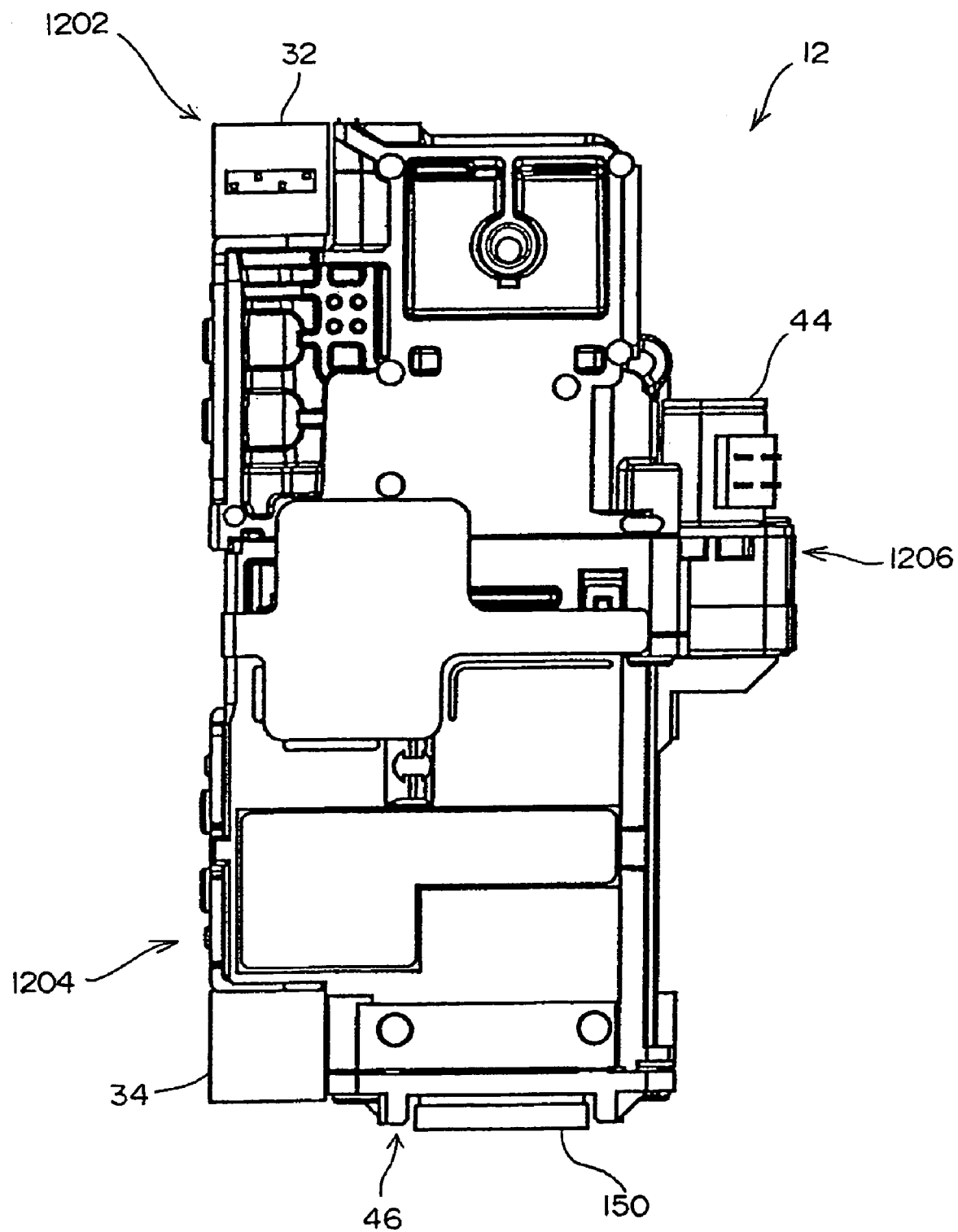
FIG. 19 is a back view of the lens barrel.
Figure 21A:
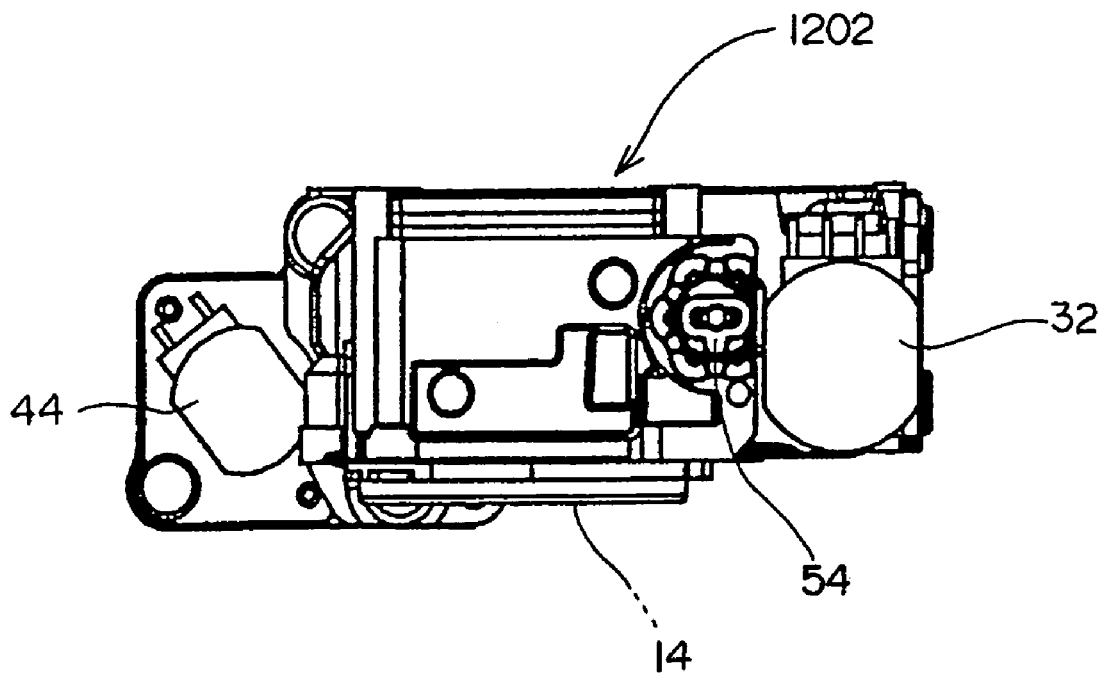
FIG. 21A is a view on arrow C in FIG. 18.
Figure 21B:
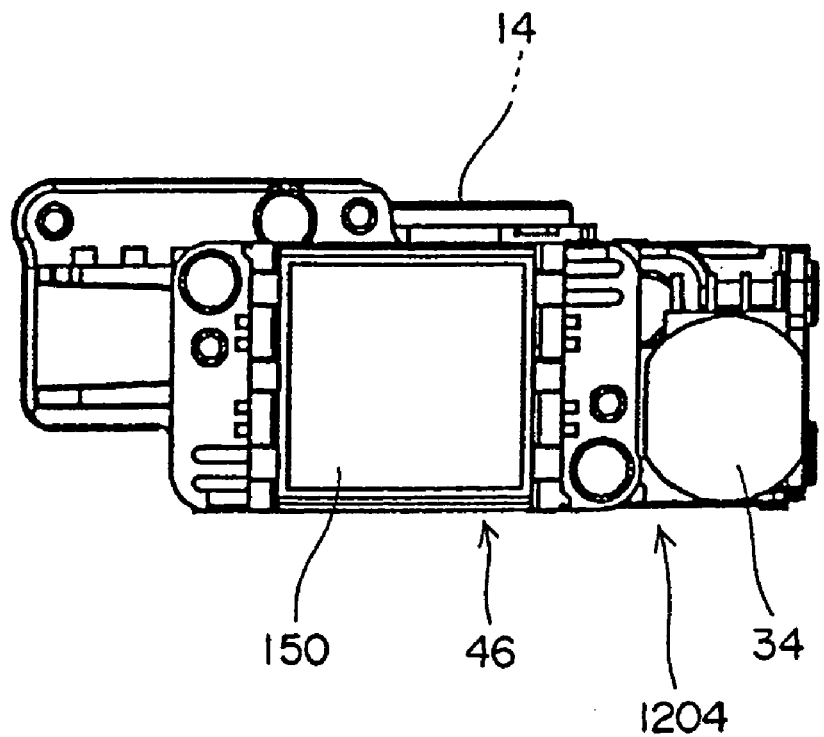
FIG. 21B is a view on arrow D in FIG. 18.

FIG. 18 is a front view of the lens barrel 10, FIG. 19 is a back view of the lens barrel 10, FIG. 20A a view on arrow A in FIG. 18, FIG. 20B is a view on arrow B in FIG. 18, FIG. 21A is a view on arrow C in FIG. 18, and FIG. 21B is a view on arrow D in FIG. 18.

Figure 22:
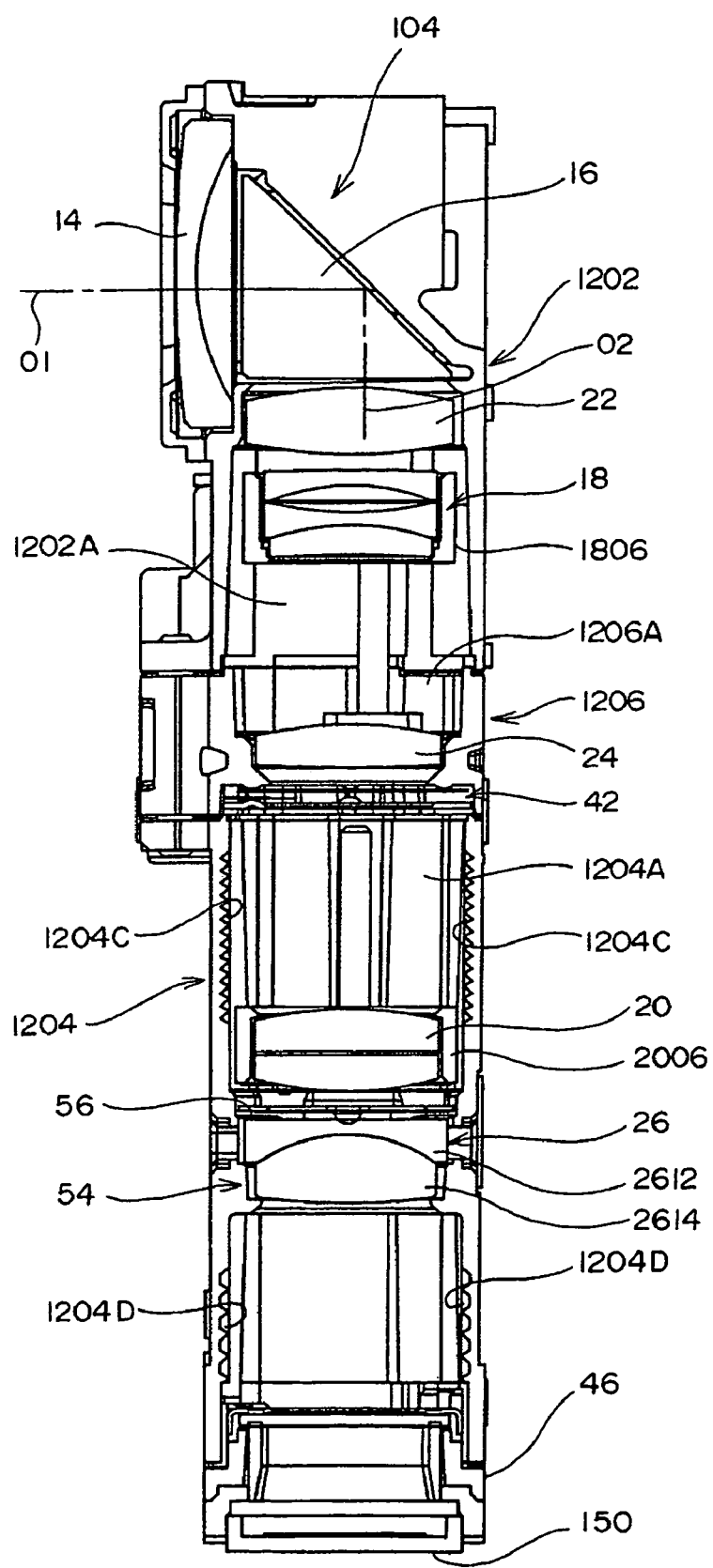
FIG. 22 is a sectional view cut along a line A-A in FIG. 16.
Figure 23:
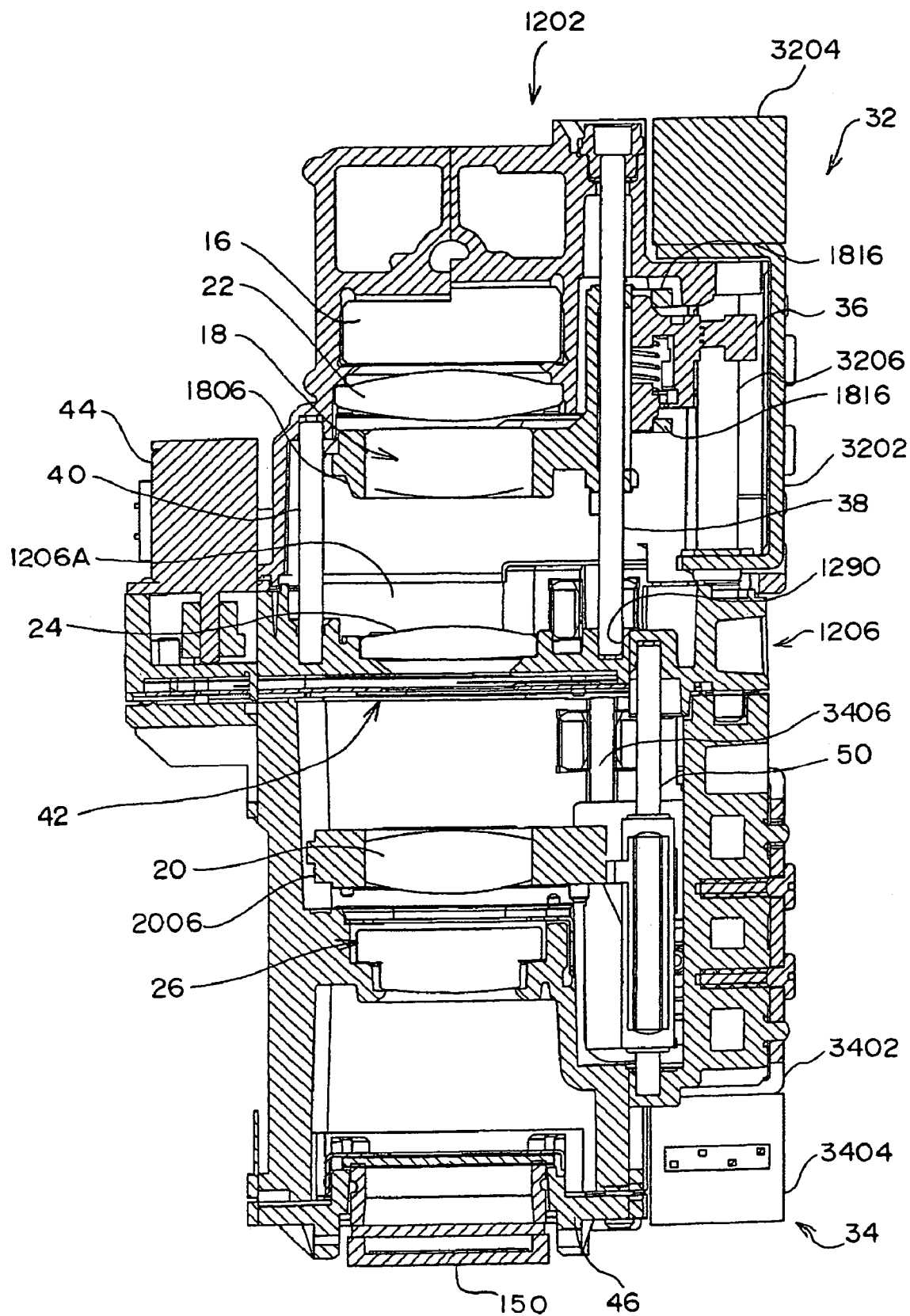
FIG. 23 is a sectional view cut along a line B-B in FIG. 16.

FIG. 22 is a sectional view along a line A-A in FIG. 16, and FIG. 23 is a sectional view along a line B-B in FIG. 16.

Figure 24:
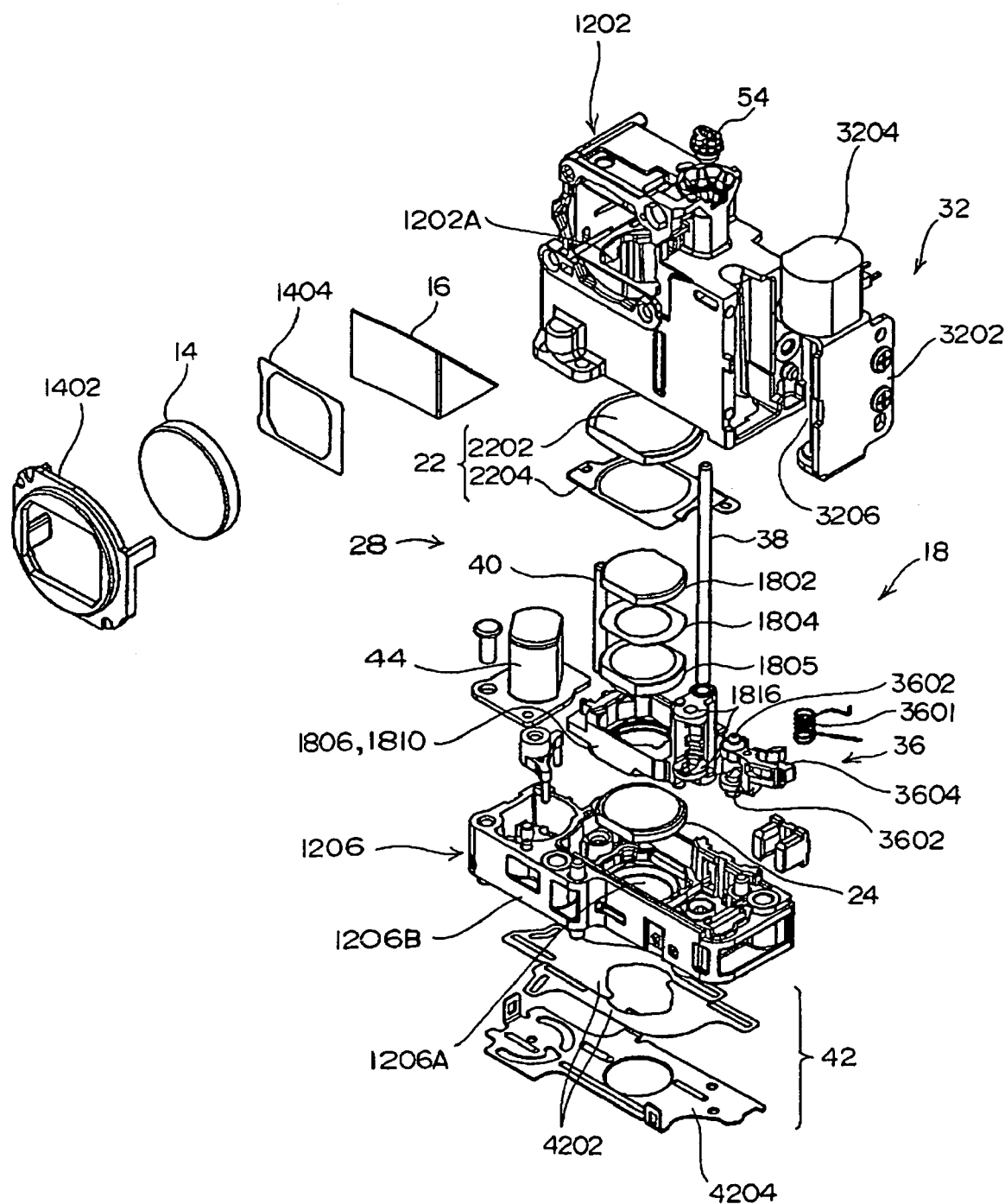
FIG. 24 is an exploded perspective view showing a partial structure of the lens barrel.
Figure 25:
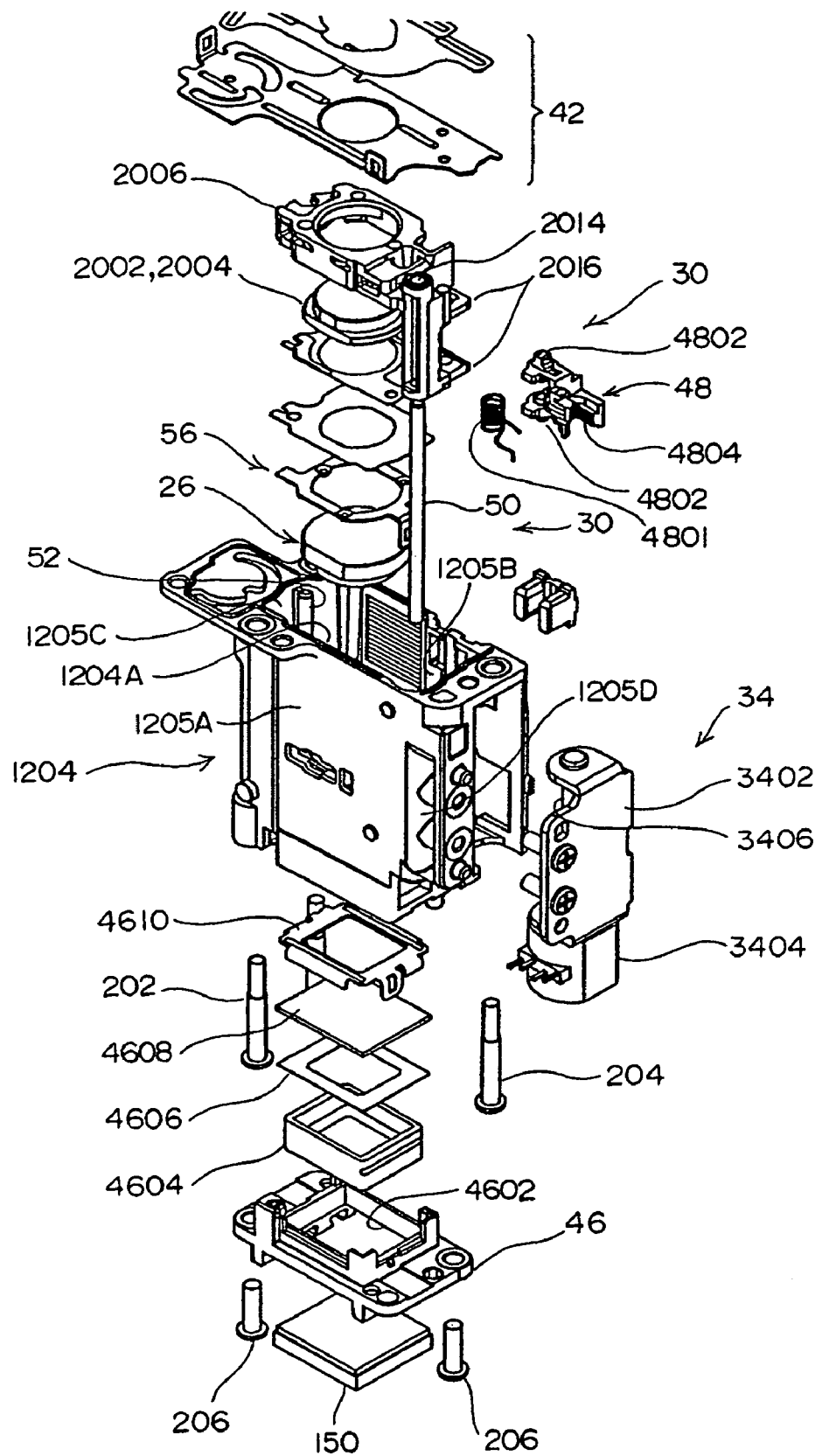
FIG. 25 is an exploded perspective view showing the remaining structure of the lens barrel.

FIG. 24 is an exploded perspective view showing a part of a structure of the lens barrel 10, and FIG. 25 is an exploded perspective view showing the remaining structure of the lens barrel 10.

Figure 26:
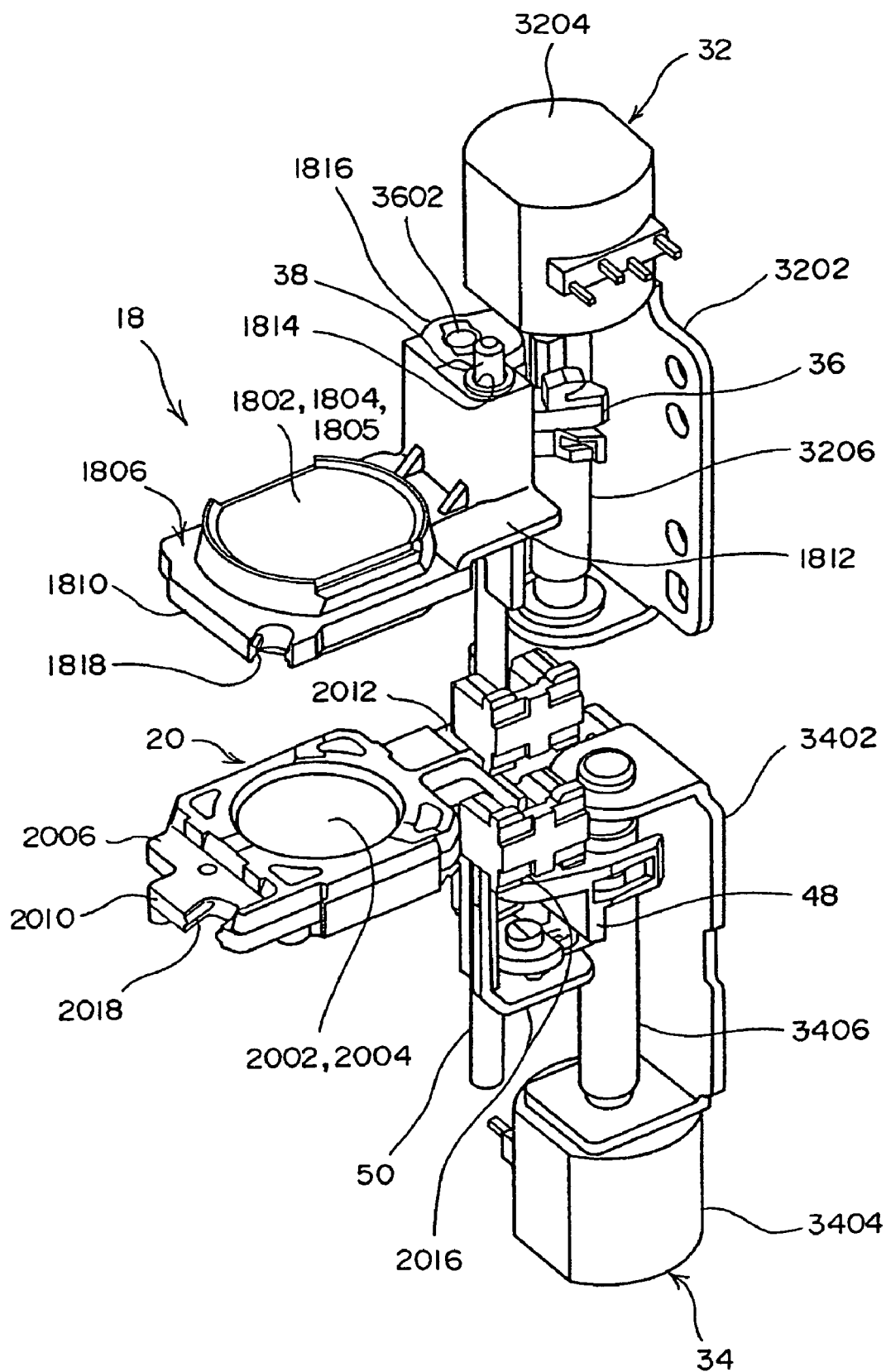
FIG. 26 is a perspective view showing a movable zoom lens group and a movable focus lens group.

FIG. 26 is a perspective view showing a movable zoom lens group 18 and a movable focus lens group 20.

As shown in FIGS. 22 to 25, in addition to the objective lens 14 described above, the optical system 104 includes: a reflecting member 16, a movable zoom lens group 18, a movable focus lens group 20, a first fixed lens group 22, a second fixed lens group 24, a third fixed lens group 26, a guide mechanism 38 for the movable zoom lens group 18, and a guide mechanism 50 for the movable focus lens group 20.

Furthermore, the optical system 104 is also provided with driving means 32 for moving the movable zoom lens group 18 and driving means 34 for moving the movable focus lens group 20.

As shown in FIGS. 16 and 17, a barrel presents a flat rectangular plate-like shape having a thickness, a width larger than the thickness and a length larger than the width. The image pickup element 150 and the optical system 104 are arranged in a longitudinal direction of the barrel 12 in a part of the barrel 12 slightly closer to one side in a width direction from the center in the width direction.

The barrel 12 is composed of a first barrel divided body part 1202 and a second barrel divided body part 1204 obtained by the division in the longitudinal direction and a third barrel divided body part 1206 interposed between the first and the second barrel divided bodies 1202 and 1204. The first barrel divided body part 1202 is located as a half of the barrel 12 in the longitudinal direction, whereas the second barrel divided body part 1204 is located as the other half of the barrel 12 in the longitudinal direction. The third barrel divided body part 1206 is interposed between the first barrel divided body part 1202 and the second barrel divided body part 1204.

In this embodiment, as shown in FIGS. 11 and 12, the lens barrel 10 (the barrel 12) is arranged so that its longitudinal direction is identical with the vertical direction. Therefore, referring back to FIGS. 16 and 17, the first barrel divided body part 1202 is situated in the upper part of the barrel 12, the second barrel divided body part 1204 is situated in the lower part of the barrel 12, and the third barrel divided body part 1208 is situated in the middle of the barrel 12 in the vertical direction. One of the surfaces of the barrel 12 in the thickness direction, which is parallel to the front face of the case 102 of the image pickup apparatus 100, serves as a front face of the barrel 12, whereas the other surface of the barrel 12, which is parallel to the rear face of the case 102, serves as a rear face of the barrel 12. One of the faces of the barrel 12 serves as a left side face, whereas the other face serves as a left side face.

Thus, the barrel 12 is provided in the case 102 so that its width direction, length direction and thickness direction are identical with the horizontal direction, the vertical direction, the anteroposterior direction of the case 102.

In this embodiment, each of the first to third barrel divided body parts 1202, 1204 and 1206 is formed of a synthetic resin material.

As shown in FIGS. 22 through 24, the first barrel divided body part 1202 is formed in a flat rectangular parallelepiped shape with a front wall, a rear wall, a left wall and a right wall. A component housing space 1202A having a rectangular sectional shape and a lower open end is provided in the first barrel divided body part 1202. The objective lens 14 is attached onto the upper part of the front face of the first barrel divided body part 1202 while a lens holder 1402 is positioned on the front face side of the objective lens 14 and a light-shielding frame 1404 is positioned on the rear face side.

The reflecting member 16 reflects an image captured by the objective lens 14 downward (toward the image pickup element 150). In this embodiment, a prism is used as the reflecting member 16. The reflecting member 16 is provided within the component housing space 1202A so as to face the rear side of the objective lens 14.

In this embodiment, an optical path of the optical system 104 for projecting the object image on the image pickup element 150 is composed of a first optical path part extending backward from the objective lens 14 to the reflecting surface of the reflecting member 16 and a second optical path part extending downward from the reflecting surface of the reflecting member 16 to the image pickup element 150. In FIG. 22, the reference numeral O1 denotes an optical axis of the first optical path part, whereas the reference numeral O2 denotes an optical axis of the second optical path part.

The first fixed lens group 22 and the movable zoom lens group 18 are provided in the component housing space 1202A below the reflecting member 16.

As shown in FIG. 24, the first fixed lens group 22 includes a first fixed lens 2202 fitter into an attachment part of the first barrel divided body part 1202 and a holding member (also serving as a light-shielding frame) 2204 for fixing the first fixed lens 2202 to the attachment part.

As shown in FIGS. 22 through 24, the movable zoom lens group 18 includes a first zoom lens 1802 and second and third zoom lenses 1804 and 1805 bonded to each other. The first to third zoom lenses 1802, 1804 and 1805 are supported by a zoom lens frame 1806. The zoom lens frame 1806 is guided along the main guide shaft 28 and a sub-guide shaft 40 by the driving means 32 to reciprocate in their optical axis direction to achieve a zoom operation.

As shown in FIG. 26, the zoom lens frame 1806 includes a holding section 1801 situated around the first to third zoom lenses 1802, 1804 and 1805 to hold the first to third zoom lenses 1802, 1804 and 1805 and an extending section 1812 extending from the holding section 1801 in the width direction of the component housing space 1202A.

Figure 5:
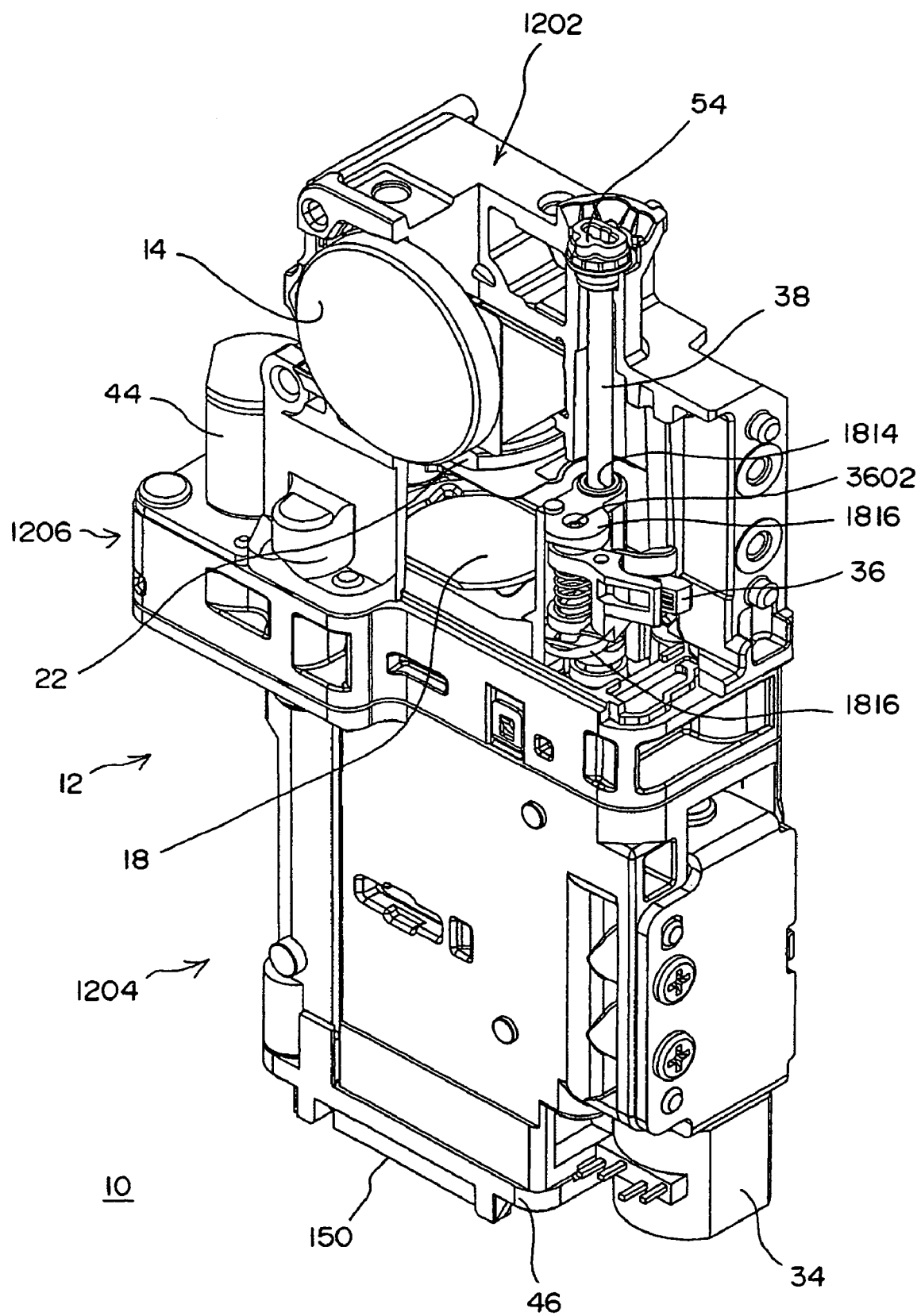
FIG. 5 is a perspective view showing a partially cutaway lens barrel.

The extending section 1812 is provided with flanges 1816 opposed to each other in the longitudinal direction of the barrel 12, as shown in FIGS. 5 and 24. A hole is provided in each of the flanges 1816 on the same axis. Shafts 3602 are inserted rotatably into the holes, respectively, so that an internal thread member 36 is connected between the flanges 1816 immovably in the longitudinal direction of the barrel 12 and oscillatably about the shaft 3602 as a supporting point. The internal thread member 36 has a pair of arms biased in a closing direction by a spring 3601. An internal thread 3604 is provided on each of the surfaces of the arms, which face each other.

As shown in FIG. 26, a rod insertion hole 1814 is provided in the extending section 1812. The main guide shaft 38 made of a metal, which extends in the longitudinal direction of the first barrel divided body part 1202, is slidably inserted into the rod insertion hole 1814. Both ends of the main guide shaft 38 in the longitudinal direction are supported by a wall constituting the upper face of the first barrel divided body part 1202 and a wall of the third barrel divided body part 1206. The main guide shaft 38 extends straight in parallel to the optical axes of the first to third zoom lenses 1802, 1804 and 1805. In this embodiment, the main guide shaft 28 extends in the longitudinal direction of the first barrel divided body part 1202. Therefore, the main guide shaft 38 guides the movable zoom lens group 18 in the optical axis direction of the movable zoom lens group 18.

Moreover, as shown in FIG. 26, an engagement groove 1818 is formed in a part of the holding section 1810 on the side opposed to the extending part 1812, at the position corresponding to the corner of the component housing space 1202A.

The sub-guide shaft 40 (shown in FIG. 24) extending in the longitudinal direction of the first barrel divided body part 1202 is slidably inserted into the engagement groove 1818. Therefore, the sub-guide shaft 40 prevents the zoom lens 18 from rotating about the main guide shaft 38. The sub-guide shaft 40 extends straight in parallel to the optical axes of the first to third zoom lenses 1802, 1804 and 1805. The sub-guide shaft 40 extends in the longitudinal direction of the first barrel divided body part 1202 in this embodiment.

The guide mechanism 28 for the movable zoom lens group 18 is composed of the main guide shaft 38 and the sub-guide shaft 40.

As shown in FIGS. 24 and 26, the driving means 32 for moving the movable zoom lens group 18 includes a holder 3202 extending in the longitudinal direction of the barrel 12, a motor 3204 provided on the holder 3202, and an external thread member 3206 extending along the holder 3202 and rotatably driven by the motor 3204.

The holder 3202 is attached to a notched part on the right side face of the first barrel divided body part 1202. With this arrangement, the external thread member 3206 is positioned in the component housing space 1202A, whereas the motor 3204 is positioned on the upper face of the first barrel divided body part 1202.

The external thread member 3206 is threadably mounted on the internal thread 3604 of the internal thread member 36. As a result, the normal and reverse rotation of the motor 3204 causes the movable zoom lens group 18 to be guided by the main guide shaft 38 and the sub-guide shaft 40 to reciprocate the movable zoom lens group 17 along the optical axis directions of the main guide shaft 38 and the sub-guide shaft 40, thereby achieving the zoom operation.

In this embodiment, the movable zoom lens group 18, the main guide shaft 38 and the external thread member 3206 are arranged in the first barrel divided body part 1202 in the width direction of the first barrel divided body part 1202. The sub-guide shaft 40 is provided at the zoom lens frame 1806 positioned so as to be opposite to the main guide shaft 38 and the external thread member 3206.

As shown in FIGS. 22, 23 and 24, the third barrel divided body part 1206 includes an internal part 1206A oriented toward the interior of the component housing space 1202A and an external part 1206B oriented toward the exterior of the component housing space 1202A.

As shown in FIG. 24, the second fixed lens group 24 is attached to the internal part 1206A while the optical axis of the second fixed lens group 24 is being made identical with that of the movable zoom lens group 18. On the rear face of the second fixed lens 24, an iris (diaphragm) 42 is provided.

The iris 42 includes two diaphragm blades 4202 arranged so as to interpose the optical axis of the optical system 104 in the width direction and a guiding member 4204 for movably guiding each of the diaphragm blades 4202 in the width direction.

The driving means 44 attached to the external part 1206B of the third barrel divided body part 1206 moves the two diaphragm blades 4202 so as to bring them closer to each other or to separate them from each other to open or close the two diaphragm blades 4202. In this manner, the iris 42 adjusts a light quantity of a light beam traveling along the optical axis.

As shown in FIG. 25, the second barrel divided body part 1204 is formed in a rectangular parallelepiped shape by a front wall 1205A, a rear wall 1205B, a left wall 1205C and a right wall 1205D. In the second barrel divided body part 1204, a component housing space 1204A having a rectangular cross section and an upper and a lower open ends.

An image pickup element attachment plate 46 is attached to the lower part of the second barrel divided body part 1204. The attachment of the image pickup element attachment plate 46 closes the lower end of the component housing space 1204A. Therefore, in this embodiment, the second barrel divided body part 1204 is constituted to include the image pickup element attachment plate 46.

The movable focus lens group 20 and the third fixed lens group 26 are provided in the component housing space 1204A.

As shown in FIG. 25, the movable focus lens group 20 is composed of a first focus lens 2002 and a second focus lens 2004 bonded to each other. The first and the second focus lenses 2002 and 2004 are supported by the focus lens frame 2006. The focus lens frame 2006 is guided along the main guide shaft 50 and the sub-guide shaft 52 by the driving means 34 to reciprocate in their optical axis direction, thereby achieving a focusing operation.

As shown in FIG. 26, the focus lens frame 2006 is located around the first and the second focus lenses 2002 and 2004. The focus lens frame 2006 has a holding section 2010 for holding the first and the second focus lenses 2002 and 2004 and an extending section 2012 extending from the holding section 2010 in the width direction of the component housing space 1204A.

The extending section 2012 is provided with flanges 2016 opposed to each other in the longitudinal direction of the barrel 12, as shown in FIG. 25. A hole is provided in each of the flanges 2016 on the same axis. Shafts 4802 are inserted rotatably into the holes, respectively, so that an internal thread member 48 is connected between the flanges 2016 immovably in the longitudinal direction of the barrel 12 and oscillatably about the shaft 4802 as a supporting point. The internal thread member 48 has a pair of arms biased in a closing direction by a spring 4801. An internal thread 4804 is provided on each of the surfaces of the arms, which face each other.

As shown in FIG. 25, a rod insertion hole 2014 is provided in the extending section 2012. As shown in FIGS. 25 and 26, a main guide shaft 50 made of a metal is slidably inserted into the rod insertion hole 2014. Both ends of the main guide shaft 50 in the longitudinal direction are supported by the wall of the third barrel divided body part 1206 and a wall provided below the second barrel divided body part 1204. The main guide shaft 50 extends straight in parallel to the optical axes of the first and second focus lenses 2002 and 2004. In this embodiment, the main guide shaft 50 extends in the longitudinal direction of the second barrel divided body part 1204. Therefore, the main guide shaft 50 guides the movable focus lens group 20 in the optical axis direction of the movable focus lens group 28.

Moreover, as shown in FIG. 26, an engagement groove 2018 is formed in a part of the holding section 2010 on the side opposed to the extending part 2012. A sub-guide shaft 52 (shown in FIG. 25) is slidably inserted into the engagement groove 2018. Therefore, the sub-guide shaft 52 prevents the focus lens 20 from rotating about the main guide shaft 50. The sub-guide shaft 52 is integrally formed with the second barrel divided body part 1204 and therefore is made of a synthetic resin. The sub-guide shaft 52 extends straight in parallel to the optical axes of the first and second focus lenses 2002 and 2004. The sub-guide shaft 52 extends in the longitudinal direction of the second guide tube divided body part 1204 in this embodiment.

The guide mechanism 30 for the movable focus lens group 20 is composed of the main guide shaft 50 and the sub-guide shaft 52.

As shown in FIGS. 25 and 26, the driving means 34 for moving the movable focus lens group 20 includes a holder 3402 extending in the longitudinal direction of the barrel 12, a motor 2404 provided below the holder 3402, and an external thread member 3406 extending along the holder 2402 to be rotary driven by the motor 2404.

The holder 3402 is attached to a notched part on the right side face of the second barrel divided body part 1204. With this arrangement, the external thread member 3406 is positioned within the component housing space 1204A, whereas the motor 3404 is positioned in the lower part of the second barrel divided body part 1204.

The external thread member 3406 is threadably mounted on an internal thread 4804 of an internal thread member 48. As a result, the normal and reverse rotation of the motor 3404 causes the movable focus lens group 20 to be guided by the main guide shaft 50 and the sub-guide shaft 52 to reciprocate the movable focus lens group 120 along the optical axis directions of the main guide shaft 50 and the sub-guide shaft 52, thereby achieving the focusing operation.

In this embodiment, the movable focus lens group 20, the main guide shaft 50 and the external thread member 3404 are arranged in the second barrel divided body part 1204 in the width direction of the second barrel divided body part 1204. The sub-guide shaft 52 is provided at the focus lens frame 2006 positioned to be opposite to the main guide shaft 50 and the external thread member 3406.

As shown in FIG. 25, the image pickup element attachment plate 46 is attached to the lower part of the second barrel divided body part 1204 by screws 206 so as to close the lower end of the component housing space 1204A. The image pickup element 150 is provided on the inner surface of the image pickup element attachment plate 46 which faces the component housing space 1204A.

In this embodiment, a rectangular window 4602 is provided through the image pickup element attachment plate 46. The image pickup element 150 is provided after being inserted into the window 2602. A seal glass 4604, a seal rubber 4606 and a low-pass filter 4608 are provided on the inner surface of the image pickup element attachment plate 46 so as to be secured by a keep plate 4610.

As shown in FIG. 22, concavo-convex portions 1204C are provided on the front face and the rear face of the second barrel divided body part 1204, which face the component housing space 1204A, between the upper end of the second barrel divided body part 1204 and the third fixed lens group 26.

Concavo-convex portion 1204D are provided on the front face and the rear face of the second barrel divided body part 1204, which face the component housing space 1204A, between the third fixed lens group 26 and the image pickup element 150.

The concavo-convex portions 1204C and 1204D are provided for the following reason. Among light beams traveling through the objective lens 14, the reflecting member 16, the first fixed lens group 22, the movable zoom lens group 18, the second fixed lens 24 and the movable focus lens 20, a light beam reaching the front face and the rear face of the second barrel divided body part 1204, which face the component housing space 1204A, is reflected by the rear face to generate reflected light referred to as so-called flare or ghost. The concave-convex portions 1204C and 1204D are provided to prevent the reflected light from reaching a light-receiving face of the image pickup element 150 to adversely affect the imaging signal of the image pickup element 150.

A distance between concavity and convexity in the concavo-convex portions 1204D provided closer to the image pickup element 150 is formed larger than that between concavity and convexity in the concavo-convex portions 1204C provided farther from the image pickup element 150. This is because an angle of the light striking against the concavo-convex portions 1204D is smaller than that of the light striking against the concavo-convex portions 1204C. The change of the distance between the concavity and the convexity in the concavo-convex portions 1204C and 1204D in this manner provides an advantage in that removability from a die is improved for molding of the second barrel divided body part 1204.

As shown in FIG. 22, the third fixed lens group 26 is provided in the component housing space 1204A above the image pickup element 150 and below the movable focus lens group 20.

As shown in FIG. 25, the first barrel divided body part 1202, the second barrel divided body part 1204 and the third barrel divided body part 1206 are attached to each other by a screw 202 in the vicinity of the driving means 44 and by a screw 204 in the vicinity of the driving means 34.

Next, an adjustment mechanism for adjusting the optical axis of the movable zoom lens group 18 to the optical axis O2 of the second optical path part from the reflecting surface of the reflecting member 16 to the image pickup element 150 will be described.

Figure 1:
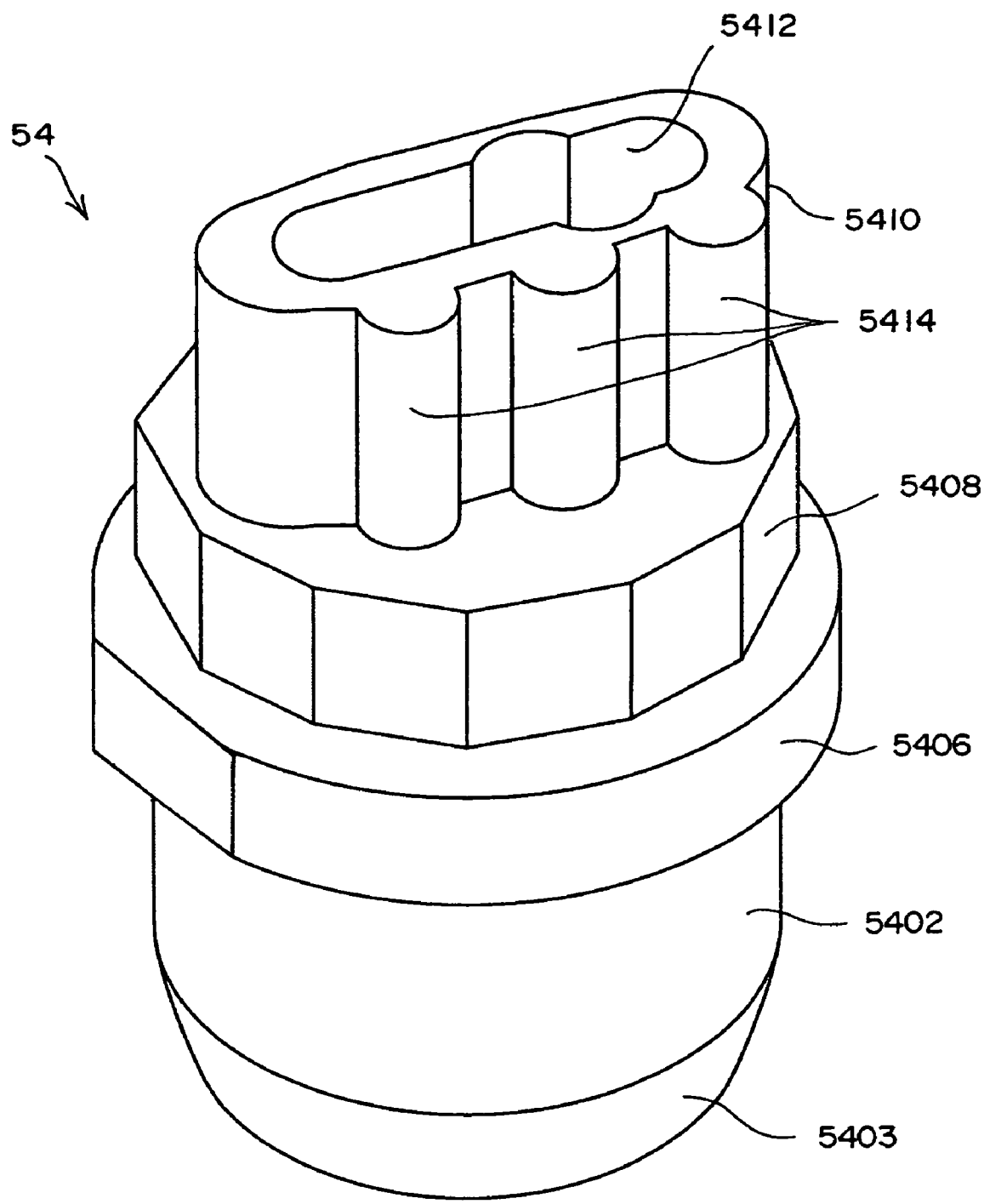
FIG. 1 is a perspective view showing a bearing member viewed from above.

FIG. 1 is a perspective view showing a bearing member viewed from above, and FIG. 2 is a perspective view showing a bearing member viewed from below.

FIG. 3(A) is a plan view showing the bearing member, FIG. 3(B) is a sectional view cut along a line B-B in FIG. 3(A), and FIG. 3(C) is a view on arrow C in FIG. 3(B);

FIGS. 4(A) through (D) are explanatory views of the bearing member, where the upper views are sectional views and the lower views are bottom views.

FIG. 5 is a perspective view showing a partially cutaway lens barrel.

Figure 6:
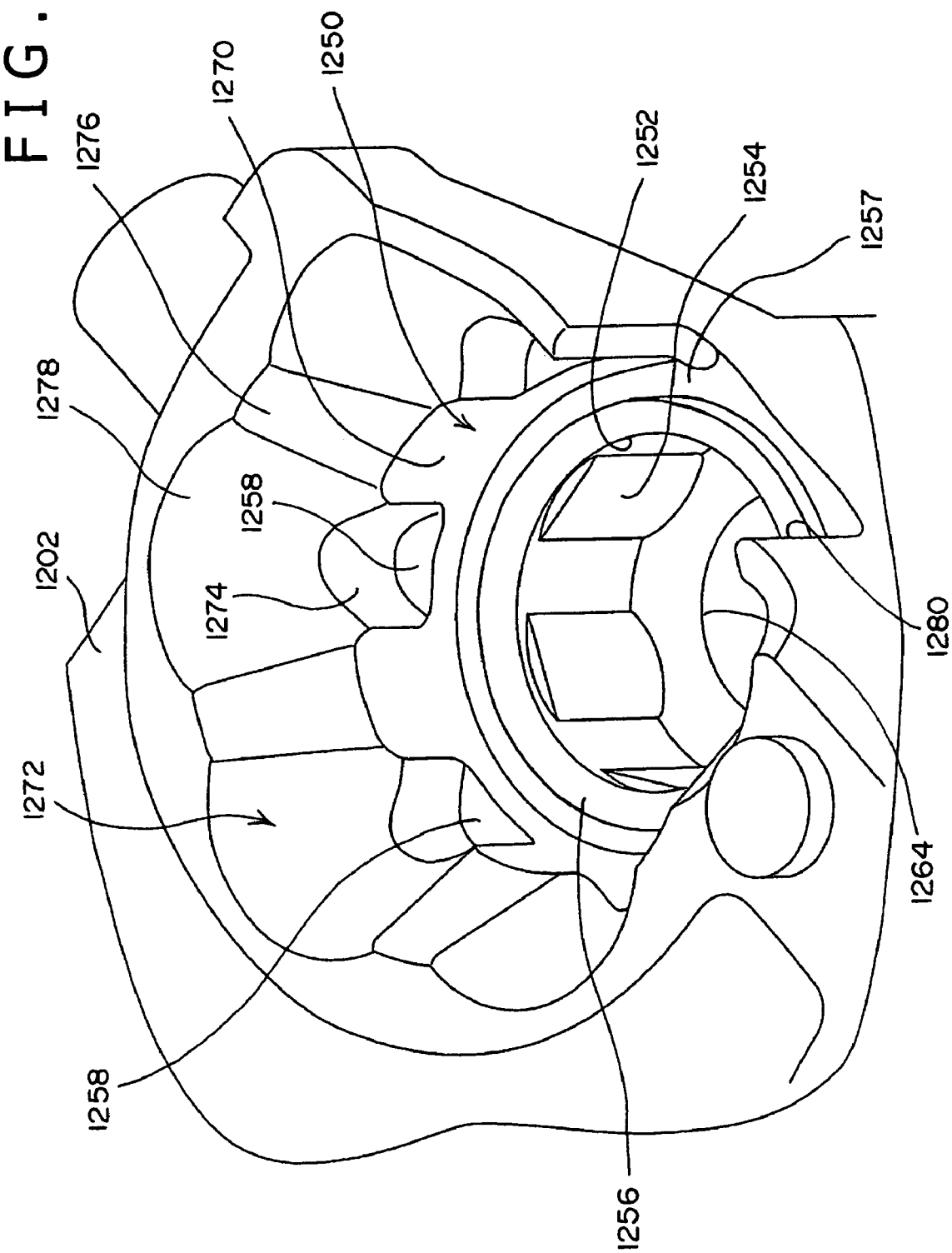
FIG. 6 is a perspective view showing a hole.
Figure 7:
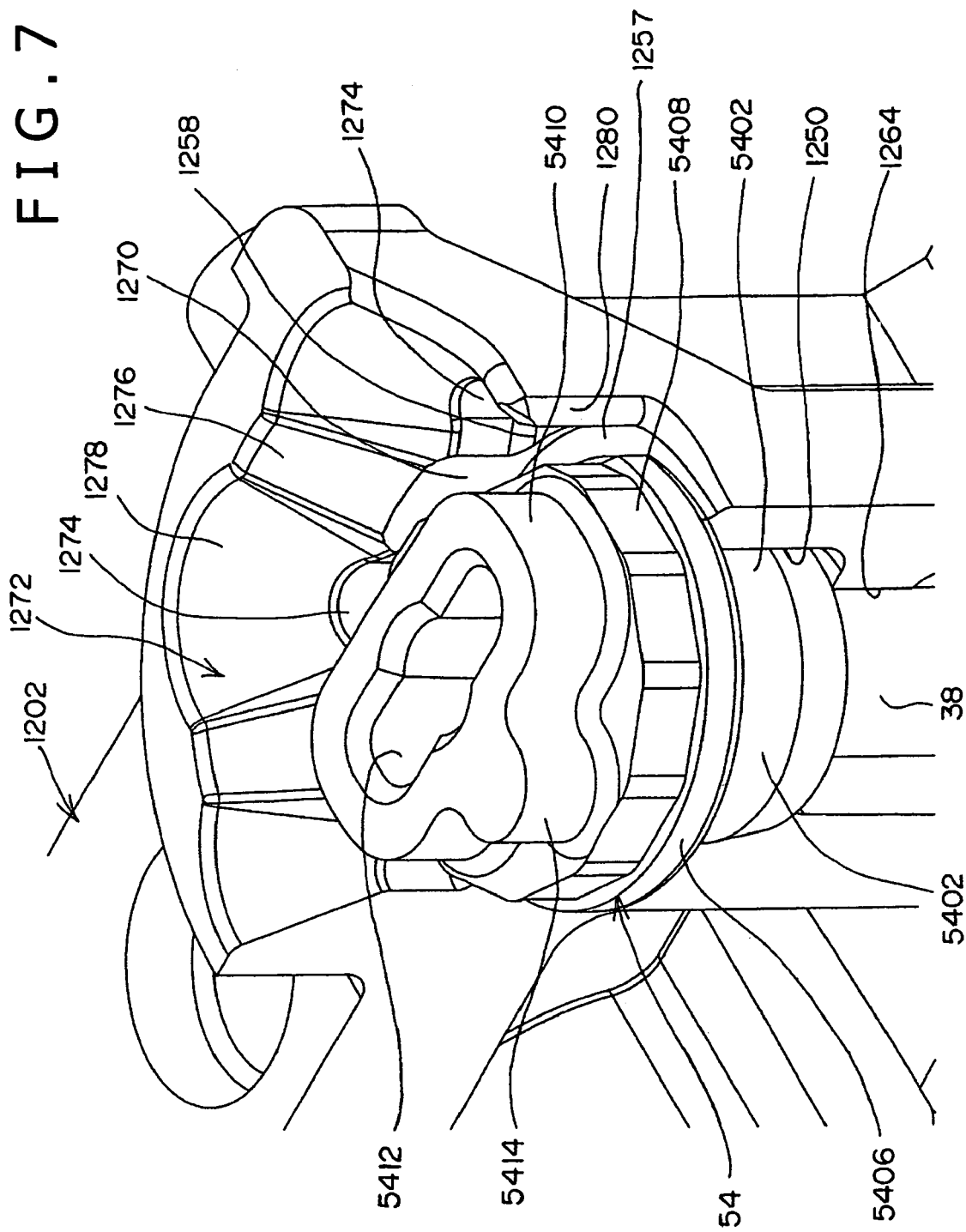
FIG. 7 is a perspective view showing a state where the bearing member is housed in the hole.
Figure 8:
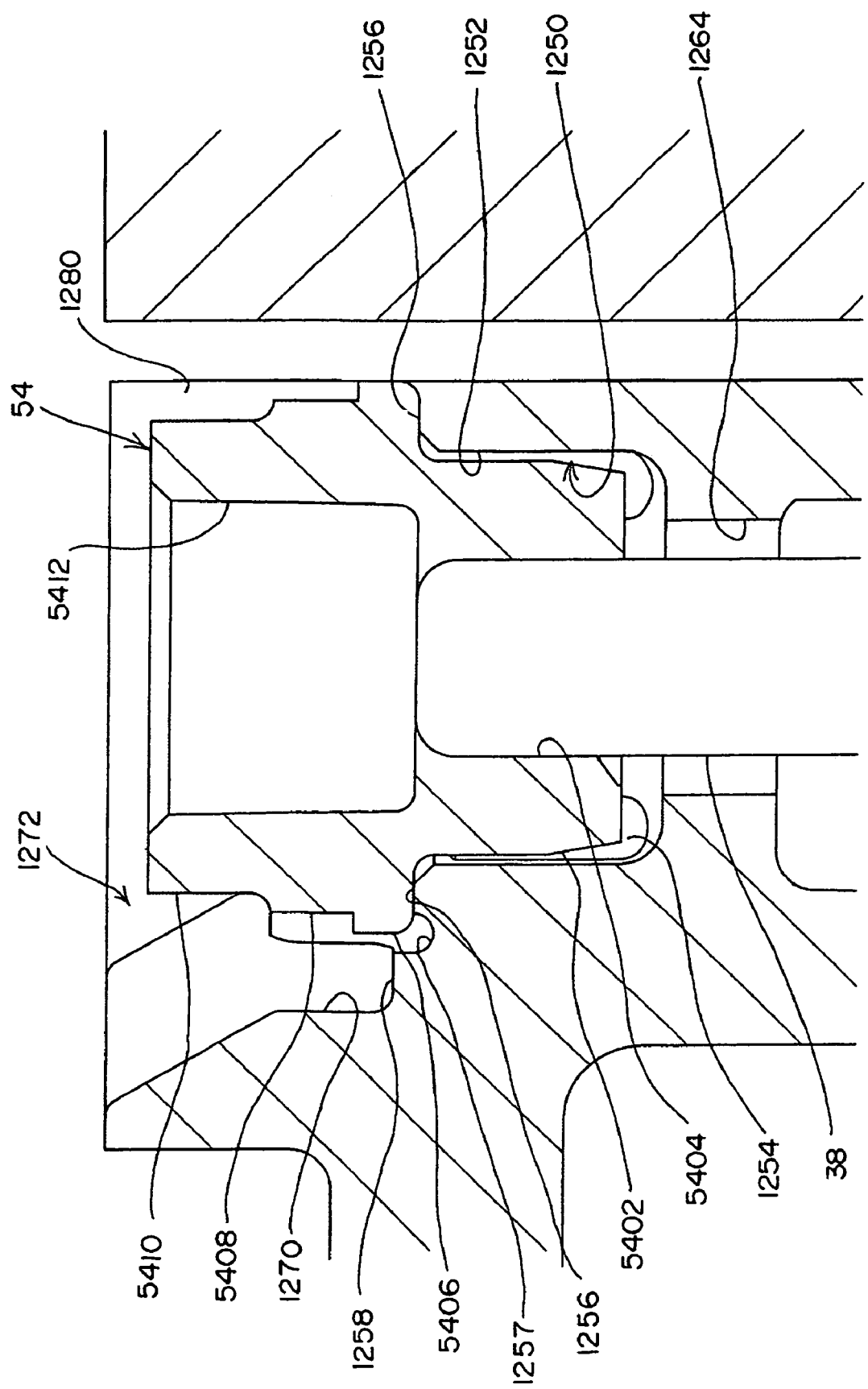
FIG. 8 is a sectional view showing a state where the bearing member is housed in the hole.

FIG. 6 is a perspective view showing a hole, FIG. 7 is a perspective view showing a state where the bearing member is housed within the hole, and FIG. 8 is a sectional view showing a state where the bearing member is housed within the hole.

Figure 9:
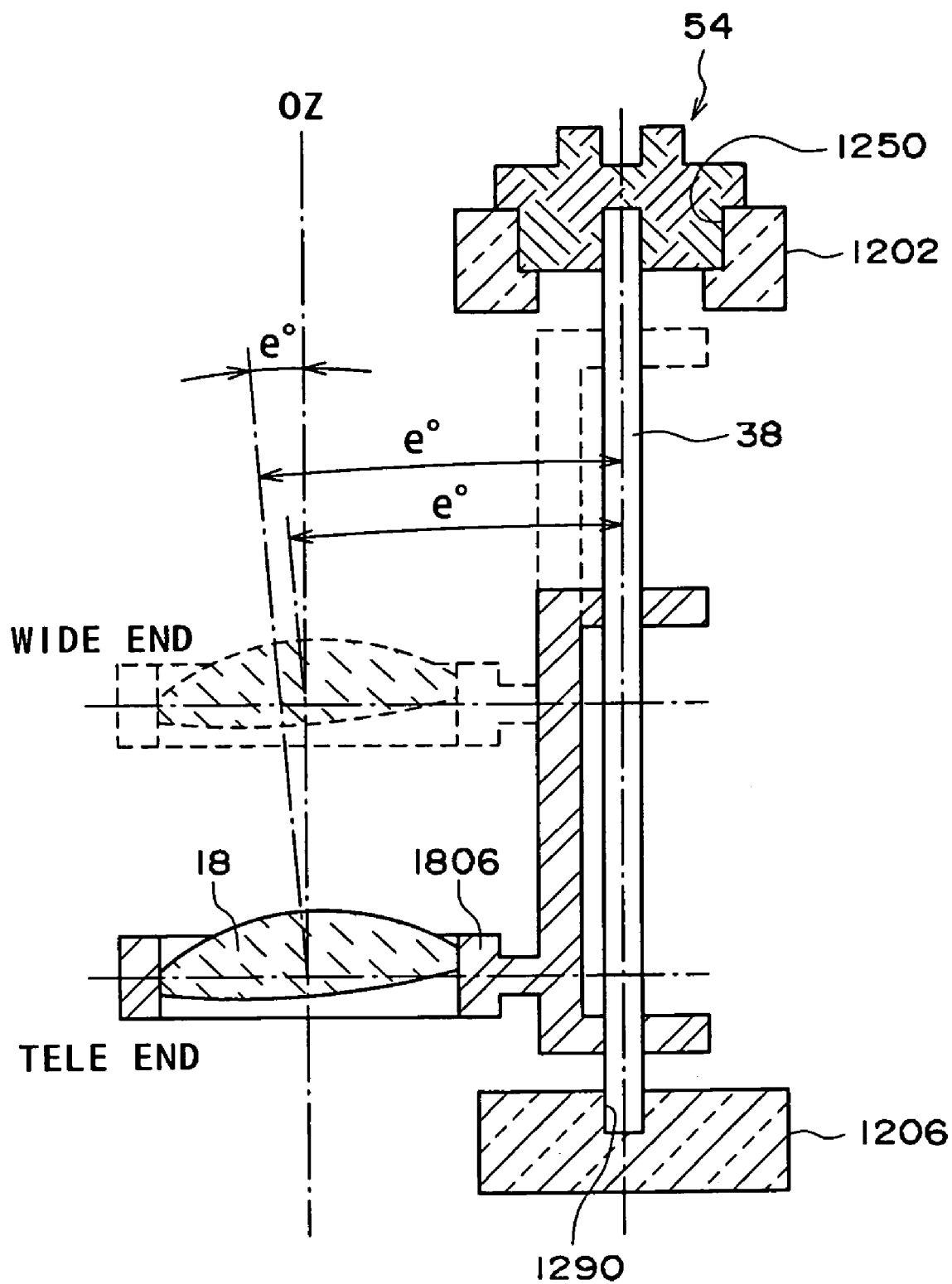
FIG. 9 is an explanatory view showing an operation of adjusting a tilt of a main guide shaft.
Figure 10:
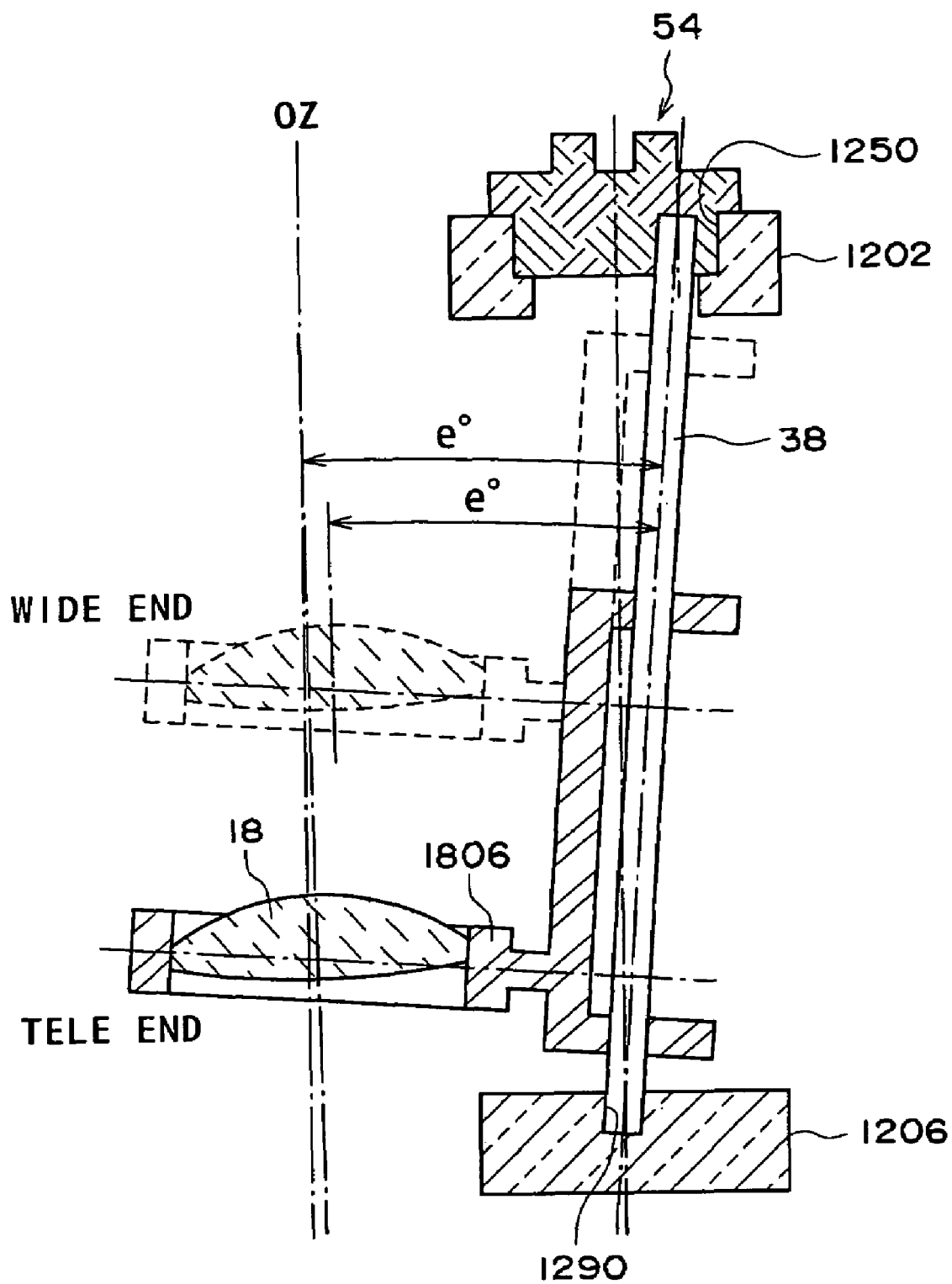
FIG. 10 is another explanatory view showing the operation of adjusting the tilt of the main guide shaft.

FIGS. 9 and 10 are explanatory views showing an adjusting operation of the tilt of the main guide shaft 38.

As described above, with reference to FIGS. 22 through 24, the movable zoom lens group 18 is retained by the zoom lens frame 1806. The zoom lens frame 1806 is guided so as to be movable straight along the main guide shaft 38 while being prevented from rotating about the main guide shaft 38 by the sub-guide shaft 40.

Both ends of the main guide shaft 38 in the longitudinal direction are supported by a wall constituting the upper face of the first barrel divided body part 1202 and a wall of the third barrel divided body part 1206.

On the other hand, the zoom lens frame 1806 has a processing error within an allowable range. The assembly of the zoom lens frame 1806 and the movable zoom lens group 18 also has an assembly error within an allowable range. Therefore, the optical axis of the movable zoom lens group 18 is sometimes tilted with respect to the optical axis O2 of the second optical path part to such a degree that the tilt exceeds the allowable value.

Moreover, the first barrel divided body part 1202 and the third barrel divided body part 1206 also have a processing error within an allowance range. The lens barrel 10 has an assembly error within an allowable range.

Therefore, in some cases, the main guide shaft 38 is tilted with respect to the optical axis O2 of the second optical path part to tilt the optical axis of the movable zoom lens group 18 with respect to the optical axis O2 of the second optical path part to such a degree that the tilt exceeds the allowable value.

If the optical axis of the movable zoom lens group 18 is tilted with respect to the optical axis O2 of the second optical axis part to exceed the allowable value, defocusing partially occurring in an object image formed on the image-forming surface of the image pickup element 150, that is, partial defocusing is caused.

Therefore, an adjustment operation for adjusting the optical axis of the movable zoom lens group 18 to the optical axis O2 of the second optical path part is required.

In this embodiment, the tilt of the main guide shaft 38 described above is adjusted at one end (an upper end) of the main guide shaft 38 in the longitudinal direction to adjust the optical axis of the movable zoom lens group 18 to the optical axis O2 of the second optical path part.

Specifically, as shown in FIG. 23, the upper end of the main guide shaft 38 is supported by a bearing member 54 attached to the wall of the first barrel divided body part 1202.

Figure 3:
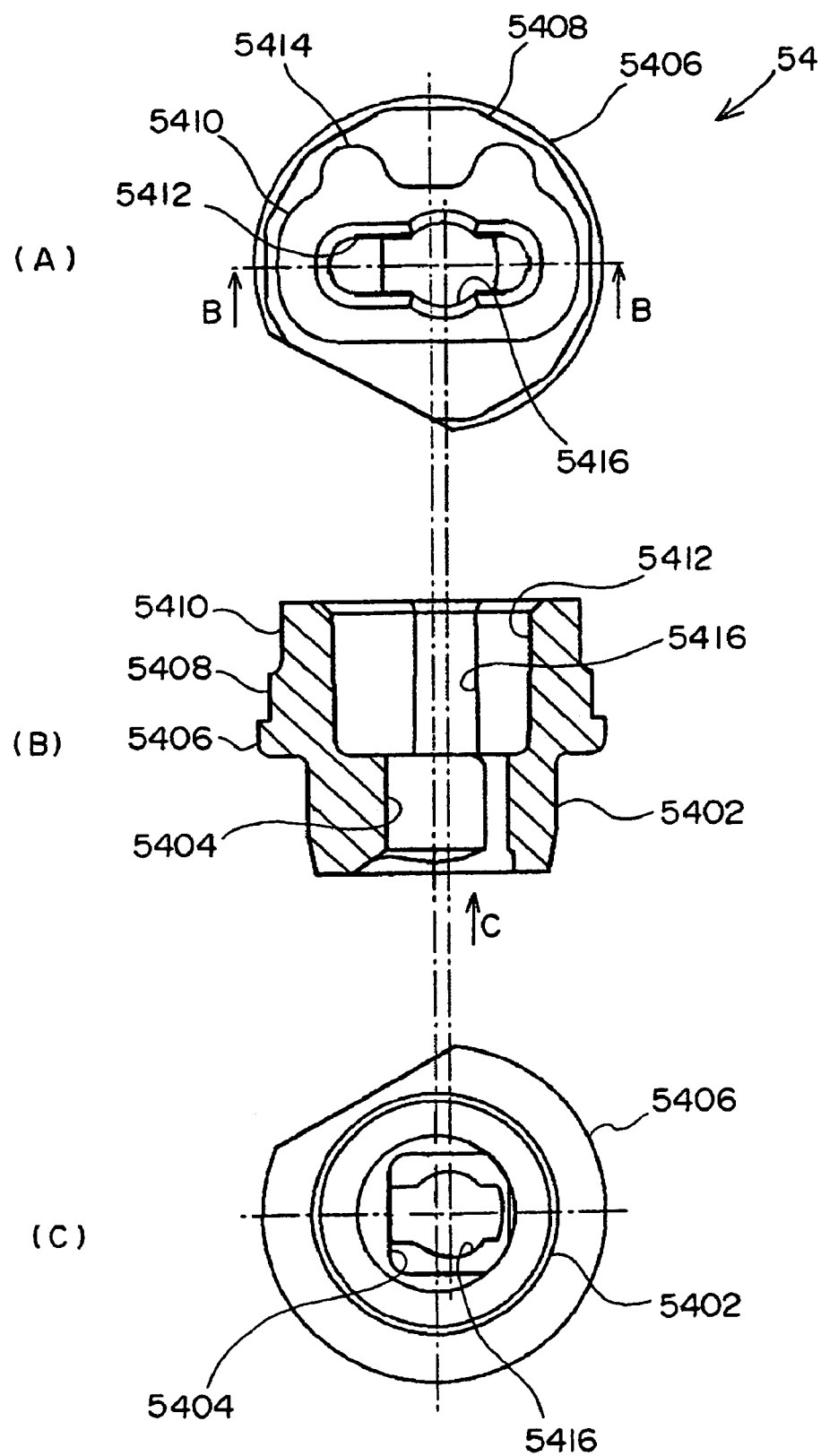
FIG. 3(A) is a plan view showing the bearing member.
FIG. 3(B) is a sectional view cut along a line B-B in FIG. 3(A)
FIG. 3(C) is a view on arrow C in FIG. 3(B)

As shown in FIGS. 1 through 3, the bearing member 54 includes: a shaft 5402 inserted from the exterior of the first barrel divided body part 1202 into a hole 1250 (FIGS. 6 through 8; see FIG. 23) in the wall of the first barrel divided body part 1202 so as to be removable therefrom; a bearing hole 5404 provided in the shaft 5402, into which the upper end of the main guide shaft 38 is inserted; a collar 5406 having a larger profile than a cross section of the hole 1250 and being abutted against an outer face of the wall of the first barrel divided body part 1202; a polygonal part 5408 having a polygonal cross section, which is provided in a projecting manner on the upper face of the collar 5406 to be on the same axis as that of the collar 5406; and an upper end 5410 provided in a projecting manner on an upper face of the polygonal part 5408.

In this embodiment, the hole 1250 and the bearing member 54 constitute supporting means recited in the claims of the present invention.

The shaft 5402 is formed in a cylindrical shape and has a tapered face 5403 formed on the lower part of the outer circumferential face of the shaft 5402 so that its radius gradually decreases as coming closer to the lower end.

The bearing hole 5404 is formed so as to be parallel to a center axis of the shaft 5402. The bearing hole 5404 is provided so that its center axis becomes eccentric from the center axis of the shaft 5402.

As shown in FIG. 2, in this embodiment, the bearing hole 5404 is formed with four flat faces provided so as to form 90 degrees therebetween. The four flat faces form a square when viewed from a plane. Therefore, when the upper end of the main guide shaft 38 is inserted into the bearing hole 5404, the four flat faces are theoretically brought into line contact with the outer circumferential face of the main guide shaft 38. The bearing hole 5404 and the upper end of the main guide shaft 38 are located on the same axis with high accuracy.

An upper end part 5410 is formed in an elongated shape when viewed on a plane. A groove 5412 (an engagement groove for a tool, recited in the claims) for inserting a tool such as a flat-blade screwdriver is formed on a top end face. Moreover, an index part 5414 formed of concavity and convexity for enabling visual confirmation of a rotational angle of the bearing member 54 is formed on the circumferential face.

Furthermore, inside the groove 5412, as shown in FIGS. 3(A) and 3(B), a pin insertion hole 5416 is formed so as to be connected to the bearing hole 5404.

Next, as shown in FIGS. 6 through 8, the hole 1250 formed in the wall of the first barrel divided body part 1202, in which the bearing member 54 is provided, and the periphery The hole 1250, into which the shaft 5402 is inserted, is formed by an inner circumferential face 1252 formed to have a larger inner diameter than the outer diameter of the shaft 5402 and a plurality of flat surfaces 1254 provided at equal intervals in the circumferential direction of the inner circumferential face and engageable with the outer circumferential face of the shaft 5402. By the engagement of the plurality of flat surfaces 1254 with the outer circumferential face of the shaft 5402, the center axis of the hole 1250 is intended to be adjusted to the center axis of the shaft 5402 with high accuracy.

On the upper end of the inner circumferential face 1252, an annular placement face 1256, on which the collar 5406 is placed, is formed. A concave groove 1257 is formed along the outer circumference of the placement face 1256. The concave groove 1257 is for guiding and discharging the excess of an adhesive that fills adhesive filling concave portions 1258 to the notch 1280 as described below.

The adhesive filling concave portions 1258 are formed at the radially outer positions of the placement face 1256, that is, on the outer circumference of the concave groove 1257 at intervals in the circumferential direction of the placement face 1256.

Minor diameter hole parts 1270 are formed in the hole 1250 and the placement face 1256 above the concave grooves 1257. Tilted hole parts 1272 are formed above the minor diameter hole parts 1270. In this embodiment, a concave portion recited in the claims of the present invention is formed by the minor diameter hole part 1270 and the tilted hole part 1272.

The minor diameter hole part 1270 has a cylindrical face 1274 rising upward from the outer circumference of the placement face 1256. The adhesive filling concave portions 1258 are provided on the cylindrical face 1274 at intervals in the circumferential direction.

The tilted hole parts 1272 are formed by tilted faces 1276 provided at equal intervals in the circumferential direction and coming closer to the center of an axis of the minor diameter hole part 1270 as coming closer to the minor diameter hole part 1270 and curve faces 1278 provided between the tilted faces 1276.

A notch 1280 is provided in the tilted hole part 1272. The concave groove 1257 is connected to the notch 1280.

As shown in FIG. 8, the upper end of the main guide shaft 38 is inserted into the bearing hole 5404 of the bearing member 54 through a major diameter hole 1264 formed in the first barrel divided body part 1202. The lower end of the main guide shaft 38 is attached by a conventionally known structure, for example, by insertion into a hole 1290 (FIG. 23) in the wall of the third barrel divided body part 1204.

According to this embodiment, the optical axis of the movable zoom lens group 18 is adjusted as follows.

Figure 4:
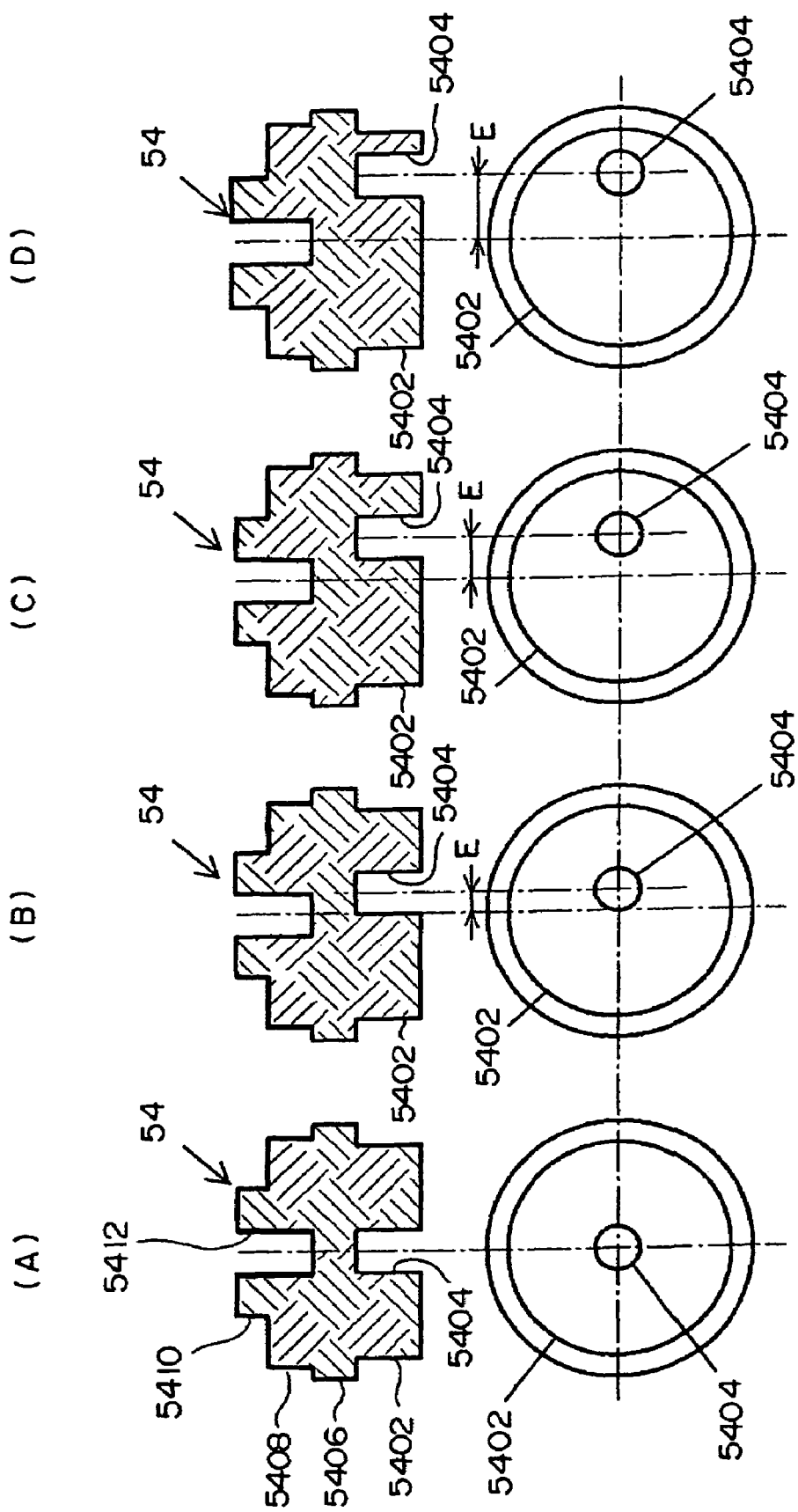
FIGS. 4(A) through (D) are explanatory views of the bearing member, where the upper views are sectional views and the lower views are bottom views.

First, as the bearing members 54, the standard bearing member 54 having the center axis of the bearing hole 5404 being adjusted to the center axis of the shaft 5402 as shown in FIG. 4(A), and the bearing members 54, each having the center axis of the bearing hole 5404 being eccentric from the center axis of the shaft 5402, are prepared. In this case, various types of the bearing members 54, each having a different amount of eccentricity E between the center axis of the bearing hole 5404 and the center axis of the shaft 5402, are prepared.

Next, the lens barrel 10 is assembled using the standard bearing member 54, Shown in FIG. 9.

At this time, in the optical system 104, shown in FIGS. 22 through 24, the components other than the movable zoom lens group 18, that is, the objective lens 14, the movable focus lens group 20, the first fixed lens group 22, the second fixed lens group 24 and the third fixed lens group 26 are subjected to optical axis adjustment.

A conventionally known adjustment chart is provided in front of the objective lens 14. An image of the chart is formed on the imaging face of the image pickup element 150 through the optical system 14. The image of the chart is analyzed based on an imaging signal output from the image pickup element 150 so as to measure partial defocusing of the image of the chart, which is formed on the image pickup element 150. As an evaluation value for measuring such partial defocusing, an MTF defocus curve is used. Besides, various conventionally known evaluation values can be used.

Based on such an evaluation value, referring back to FIG. 9, a tilt angle e of the movable zoom lens group 18 with respect to the optical axis O2 of the second optical axis part is calculated. In order to adjust the optical axis O2 of the second optical path part and the optical axis of the movable zoom lens group 18 to each other, it suffices that the main guide shaft 38 is tilted at the same angle as the tilt angle e but in the opposite direction. Therefore, the amount of eccentricity of the bearing member 54, which is required to cancel out the tilt angle e, is determined in accordance with the tilt angle e.

Next, the bearing member 54 having the amount of eccentricity E corresponding to the above-described eccentricity is selected.

Then, as shown in FIGS. 3(A) through 3(C), a pin is inserted into the pin insertion hole 5416 to remove the upper end of the main guide shaft 30 from the bearing hole 5404 in the standard bearing member 54 while removing the shaft 5402 of the standard bearing member 54 from the hole 1250 in the wall of the first barrel divided body part 1202. Then, as shown in FIG. 10, the shaft 5402 of the bearing member 54, which has the amount of eccentricity E, is inserted into the hole 1250.

Subsequently, a tool such as a flat-blade screwdriver is inserted into the groove 5412 of the bearing member 54 to turn the bearing member 54. The tilt of the main guide shaft 30 is adjusted to eliminate the partial defocusing indicated by the above-described evaluation value while the index part 5414 is being visibly confirmed. As a result, the optical axis O2 of the second optical path part becomes identical with the optical axis of the movable zoom lens group 18.

In the case where the optical system 104 achieves the zoom operation by the movement of the movable zoom lens group 18 in the optical axis direction, the tilt of the movable zoom lens group 18 with respect to the optical axis O2 of the second optical path part greatly affects the partial defocusing when the movable zoom lens group 18 is located at a tele end. On the other hand, when the movable zoom lens group 18 is located at a wide end, the effects of the tilt of the movable zoom lens group 18 with respect to the optical axis O2 of the second optical path part on the partial defocusing can be almost negligible.

Therefore, in this embodiment, the above-described adjustment operation is performed by using the optical characteristic on the basis of the optical performance when the movable zoom lens group 18 is at the tele end. Therefore, the above-described adjustment operation is performed when the movable zoom lens group 18 is located at the tele end.

Moreover, as shown in FIG. 10, by adjusting the tilt of the main guide shaft 38 with the bearing member 54, the optical axis O2 of the second optical path part and the optical axis of the movable zoom lens group 18 can be adjusted to each other at the tele end. At the wide end, however the optical axis of the movable zoom lens group 18 is sometimes offset from the optical shaft O2 of the second optical path part. However, when the movable zoom lens group 18 is located at the wide end, the offset of the optical axis of the movable zoom lens group 18 from the optical axis O2 of the second optical path part described above is almost negligible.

When the tilt angle e of the movable zoom lens group 18 with respect to the optical axis O2 of the second optical path part is equal to or lower than the allowable value, the standard bearing member 54 is adhered through an ultraviolet curable adhesive without selecting the bearing member 54 having the amount of eccentricity E.

When the adjustment operation is completed as described above, the part between the outer parts of the collar 5406, the polygonal part 5408 and the upper end part 5410, shown in FIGS. 1 through 3, and the inner parts of the minor diameter hole parts 1270 and the tilted hole parts 1272, shown in FIGS. 6 and 8, is filled with the ultraviolet curable adhesive to be cured with an ultraviolet ray, thereby completing the assembly.

In this case, since the bearing member 54 has the polygonal part 5408, the polygonal part 5408 is buried with the ultraviolet curable adhesive to effectively prevent the bearing member 54 from rotating about the center axis of the hole 1250.

Next, the effects will be described.

Referring back to FIGS. 4(A) through 4(D), the bearing member 54 for supporting the upper end of the main guide shaft 38 includes the shaft 5402 inserted from the exterior of the first barrel divided body part 1202 into the hole 1250 so as to be removable therefrom and the bearing hole 5404 having the center axis eccentric from the center axis of the shaft 5402. The upper end of the main guide shaft 38 is supported by the bearing hole 5404. Therefore, by preparing a plurality of types of the bearing members 54, each having a different amount of eccentricity E between the center axis of the bearing hole 5404 and the center axis of the shaft 5402, the easy adjustment of the optical axis of the movable zoom lens group 18 is ensured.

Moreover, the bearing member 54 having the different amount of eccentricity E is selected so as to be assembled from the outside of the first barrel divide body 1202, thereby adjusting the optical axis of the movable zoom lens group 18. Therefore, a complicated mechanism as a conventional one can be simplified. Moreover, a large space is not needed. Accordingly, such a structure is advantageous in reduction of the number of components, reduction of cost, and reduction of size of the lens barrel.

Although a digital still camera is exemplified as the image pickup apparatus in this embodiment, it is apparent that the present invention is also applicable to image pickup apparatuses such as a video camera and a television camera.

It should be understood by those skilled in the art that various modifications, combinations, sub-combinations and alterations may occur depending on design requirements and other factors insofar as they are within the scope of the appended claims or the equivalents thereof.

The invention claimed is:

1. A lens barrel, comprising:
a lens mount for holding a lens in a barrel;
a guide shaft extending parallel to an optical axis of the lens within the barrel and connected to the lens mount for guiding the lens mount along the optical axis; and
a support operable to support opposite ends of the guide shaft in its extending direction within the barrel, the support including:
a support unit operable to support at least one of the opposite ends of the guide shaft, the support unit including a hole provided in the barrel, and
a bearing member attached from the exterior of the barrel into the hole and being removable therefrom, the bearing member being rotatable about a center axis of the hole, the bearing member including:

a shaft inserted into the hole, and a bearing hole provided in the shaft, with one end of the guide shaft being inserted into the bearing hole, a center axis of the bearing hole being eccentric from a center axis of the shaft, an angle of eccentricity between the center axis of the bearing hole and the center axis of the shaft being substantially equal in magnitude and opposite in direction to a tilt angle of the lens with respect to the optical axis.

2. The lens barrel according to claim 1, wherein the bearing member includes a collar having a larger profile than a cross-section of the hole and abutting against an outer part of the barrel, and the shaft projects from the collar.

3. The lens barrel according to claim 1, wherein the bearing member includes a collar having a larger profile than a cross-section of the hole and abutting against an outer part of the barrel, the shaft projects from one surface of the collar, a polygonal part presenting a polygonal cross-sectional shape projects from another surface of the collar, the hole of the barrel includes a concave portion opening toward the exterior of the barrel, and the collar and the polygonal part are positioned in the concave portion and are held therein by an adhesive filled in the concave portion.

4. The lens barrel according to claim 1, wherein the bearing member includes a collar having a larger profile than a cross-section of the hole and abutting against an outer part of the barrel, the shaft projects from one surface of the collar, an end projects from another surface of the collar, and an index part serving as a mark for enabling visual confirmation of a rotational angle of the bearing member is formed on an outer circumferential face of the end.

5. The lens barrel according to claim 1, wherein the bearing member includes a collar having a larger profile than a cross-section of the hole and abutting against an outer part of the barrel, the shaft projects from one surface of the collar, an end projects from another surface of the collar, an index part serving as a mark for enabling visual confirmation of a rotational angle of the bearing member is formed on an outer circumferential face of the end, and an engagement groove for a tool for rotating the bearing member is formed on a top end face of the end.

6. An image pickup apparatus, comprising:

a lens barrel;

an image pickup element provided in the lens barrel; and an optical system for projecting an object image on the image pickup element within the lens barrel;

the lens barrel including:

a lens mount for holding a lens of the optical system within the barrel, a guide shaft extending parallel to an optical axis of the lens in the barrel and connected to the lens mount for guiding the lens mount along the optical axis, and a support operable to support opposite ends of the guide shaft in its extending direction in the barrel, the support including:

a support unit operable to support at least one of the opposite ends of the guide shaft, the support unit including a hole provided in the barrel, and a bearing member attached from the exterior of the barrel into the hole and being removable therefrom, the bearing member being rotatable about a center axis of the hole, the bearing member including:

a shaft inserted into the hole, and a bearing hole provided in the shaft, with one end of the guide shaft being inserted into the bearing hole, a center axis of the bearing hole being eccentric from a center axis of the shaft, an angle of eccentricity between the center axis of the bearing hole and the center axis of the shaft being substantially equal in magnitude and opposite in direction to a tilt angle of the lens with respect to the optical axis.

* * * * *